(12) United States Patent
Kubota et al.

(10) Patent No.: US 10,762,594 B2
(45) Date of Patent: Sep. 1, 2020

(54) OPTIMIZED MEMORY ACCESS FOR RECONSTRUCTING A THREE DIMENSIONAL SHAPE OF AN OBJECT BY VISUAL HULL

(71) Applicant: FUJITSU LIMITED, Kawasaki-shi, Kanagawa (JP)

(72) Inventors: Tomonori Kubota, Kawasaki (JP); Yasuyuki Murata, Shizuoka (JP)

(73) Assignee: FUJITSU LIMITED, Kawasaki (JP)

( * ) Notice: Subject to any disclaimer, the term of this patent is extended or adjusted under 35 U.S.C. 154(b) by 9 days.

(21) Appl. No.: 16/202,899

(22) Filed: Nov. 28, 2018

(65) Prior Publication Data

US 2019/0197659 A1    Jun. 27, 2019

(30) Foreign Application Priority Data

Dec. 27, 2017 (JP) ................................ 2017-252275

(51) Int. Cl.
*G06T 1/60* (2006.01)
*G06F 17/12* (2006.01)
(Continued)

(52) U.S. Cl.
CPC ................ *G06T 1/60* (2013.01); *G06F 17/12* (2013.01); *G06T 7/543* (2017.01); *G06T 7/564* (2017.01);
(Continued)

(58) Field of Classification Search
CPC .......... G06T 1/60; G06T 17/00; G06T 7/543; G06T 2207/10012; G06T 7/564
See application file for complete search history.

(56) References Cited

U.S. PATENT DOCUMENTS

| | | |
|---|---|---|
| 2006/0184545 A1 | 8/2006 | Suzuki |
| 2017/0019683 A1 | 1/2017 | Shimizu et al. |
| 2019/0174122 A1* | 6/2019 | Besley ........................ G06T 7/85 |

FOREIGN PATENT DOCUMENTS

| | | | | |
|---|---|---|---|---|
| CN | 103699497 A | * | 4/2014 | ......... G06F 12/0871 |
| JP | 2006-236334 | | 9/2006 | |
| WO | 2015/141549 | | 9/2015 | |

OTHER PUBLICATIONS

Buehler et al., Creating and rendering image-based visual hulls, MIT, LCS Computer Graphics Group, 1999. (Year: 1999).*

(Continued)

*Primary Examiner* — Maurice L. McDowell, Jr.
*Assistant Examiner* — Donna J. Ricks
(74) *Attorney, Agent, or Firm* — Fujitsu Patent Center

(57) ABSTRACT

An apparatus reconstructs a three dimensional shape of an object from a plurality of images captured from different viewpoints by visual hull. The apparatus stores, into a first memory provided for the apparatus, silhouette image data of the object extracted from the plurality of images, and determines a group of a plurality of epipolar lines having inclinations within a predetermined range in images designated as reference views among the plurality of images, based on positions of neighboring silhouette pixels in an image designated as a target view among the plurality of images. The apparatus further determines, based on the determined group and a capacity of a cache provided for the apparatus, a cache area to be used in a search for a line segment indicating a range where the object exists in each of the plurality of epipolar lines in the group.

12 Claims, 17 Drawing Sheets

(51) Int. Cl.
  *G06T 7/543* (2017.01)
  *G06T 17/00* (2006.01)
  *G06T 7/564* (2017.01)
(52) U.S. Cl.
  CPC .... *G06T 17/00* (2013.01); *G06T 2207/10012* (2013.01)

(56) References Cited

OTHER PUBLICATIONS

Matusik et al., Image based visual hulls, SIGGRAPH '00 Proceedings of the 27th annual conference on Computer graphics and interactive techniques, Jul. 2000, pp. 369-374. (Year: 2000).*
Yuichiro Fujimoto et al., "OpenCV 3 Programming Book", Mynavi Corporation, pp. 92-96, Sep. 2015 (11 pages).
Jan Erik Solem, "Programming Computer Vision with Python", O'Reilly Japan, Inc., pp. 81-86, pp. 103-118, Mar. 2013, With original English version, pp. 103-109, pp. 127-143 (46 pages).
Hiroki Mizuno et al., "A method for regularizing three dimensional scene flow by subspace constraints and estimating rigid motion", The IEICE transactions on information and systems, vol. J90-D, No. 8, pp. 2019-2027, 2007 (10 pages).
Koichiro Deguchi, "Basis of Robot Vision", Corona Publishing Co., Ltd., pp. 25-55, 2000 (24 pages).

* cited by examiner

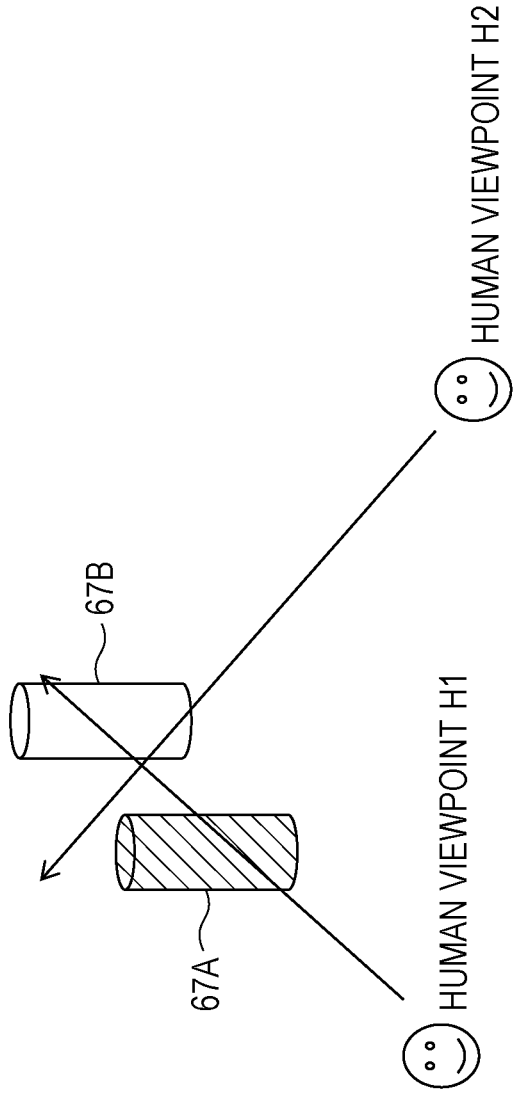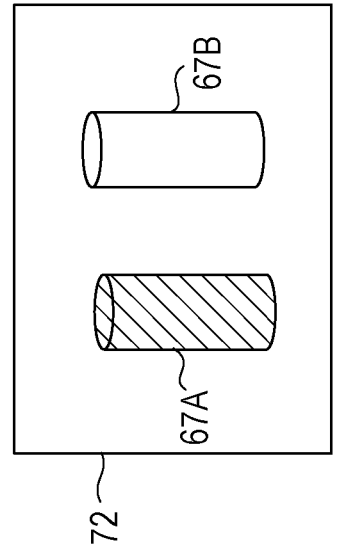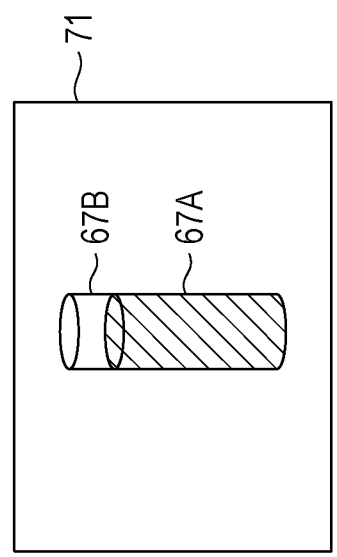

Phase 1: WIDTH AND NUMBER OF LINES ARE CHANGED ACCORDING TO DIVERGENCE BETWEEN EPIPOLAR LINES Phase 2: PREFETCH AREA, IF HAVING WIDTH NARROWER THAN MINIMUM PREFETCH WIDTH PRESET IN CONSIDERATION OF LATENCY, LINE SEGMENT SEARCH PROCESSING TIME, AND SO ON, IS DIVIDED INTO GROUPS

OPTIMIZED MEMORY ACCESS FOR RECONSTRUCTING A THREE DIMENSIONAL SHAPE OF AN OBJECT BY VISUAL HULL

CROSS-REFERENCE TO RELATED APPLICATION

This application is based upon and claims the benefit of priority of the prior Japanese Patent Application No. 2017-252275, filed on Dec. 27, 2017, the entire contents of which are incorporated herein by reference.

FIELD

The embodiments discussed herein are related to optimized memory access for reconstructing a three dimensional shape of an object by visual hull.

BACKGROUND

As one of techniques of acquiring two dimensional information of an object as a measurement target and reconstructing a three-dimensional shape of the object based on the two-dimensional information, there is a technique of reconstructing a three-dimensional shape of an object from multi-viewpoint videos. Reconstruction of the three-dimensional shape of an object from multi-viewpoint videos uses visual hull based on epipolar geometry (for example, see: Fujimoto Yuichiro et al., *OpenCV 3 Programming Book*, Mynavi Corporation, September 2015, ISBN-10:4839952965; Jan Erik Solem, translated by Aikawa Aizo, *Programming Computer Vision with Python*, O'Reilly Japan, Inc., March 2013, ISBN978-4-87311-607-5, Chapter 5 "5.1 Epipolar Geometry" and "5.2 Computing with Cameras and 3D Structure"; Mizuno Hiroki, Fujiyoshi Hironobu, and Iwahori Yuji, "A method for regularizing three dimensional scene flow by subspace constraints and estimating rigid motion", *The IEICE transactions on information and systems*, Vol. J90-D, No. 8, pp. 2019-2027 (2007); and Deguchi Koichiro, *Basis of Robot Vision*, CORONA PUBLISHING CO., LTD., 2000).

In the visual hull, a line segment search for deriving a silhouette cone involves data accesses (oblique accesses) along the inclination of a line segment. The line segment searches are performed in P parallel processes, and are each carried out by: calculating storage locations of target pixels in the silhouette image area 107' based on the position of the epipolar line found by the search; and reading the silhouette data [P] (see FIG. 19). The memory accesses to the silhouette image area 107' involve accesses to non-consecutive data areas according to the inclination of the epipolar line.

Consecutive data areas are optimal as memory access locations for a usual processing system, but oblique access locations in a line segment search are non-consecutive data areas. The oblique accesses by a memory access unit 104' illustrated in FIG. 19 are so largely affected by a memory latency (response delay time) that a response delay time occurs.

In the case of using a graphics processing unit (GPU) in the above processing, if the relation between threads to be processed in one batch (which is a unit called a warp in some GPUs) and data access locations follows a regular pattern, data access efficiency is high (called coalesce access in some GPUs). In contrast, when the processing by the GPU accesses non-consecutive data areas or accesses data in an irregular pattern, two or more accesses are made during 1 warp (such a memory access is called replay in some GPUs).

Moreover, the latency varies depending on a memory layer. A conceivable way to avoid an increase in the number of accesses to a memory with a long latency is to accumulate a group of frequently used data in a high-speed storage device. As a known example thereof, there is a method of improving a processing speed by cache hits (desired data is found in a cache and may be read) by limiting a memory space to be accessed (for example, see International Publication Pamphlet No. WO 2015/141549).

SUMMARY

According to an aspect of the embodiments, an apparatus reconstructs a three dimensional shape of an object from a plurality of images captured from different viewpoints by visual hull. The apparatus stores, into a first memory provided for the apparatus, silhouette image data of the object extracted from the plurality of images, and determines a group of a plurality of epipolar lines having inclinations within a predetermined range in images designated as reference views among the plurality of images, based on positions of neighboring silhouette pixels in an image designated as a target view among the plurality of images. The apparatus further determines, based on the determined group and a capacity of a cache provided for the apparatus, a cache area to be used in a search for a line segment indicating a range where the object exists in each of the plurality of epipolar lines in the group.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 4A, 4B, and 4C are diagrams for explaining a method of generating a free viewpoint image of an object;

DESCRIPTION OF EMBODIMENTS

In the case of reconstructing a three dimensional shape of an object in the visual hull, a line segment search for deriving a silhouette cone involves data access along the inclination of a line segment (oblique access) as described above. For this reason, in the case where a line segment search makes data accesses for epipolar lines one by one, the number of access requests per data size is increased and accordingly a time required to complete line segment searches concerning all the epipolar lines is increased.

It is preferable to optimize memory accesses in an information processing apparatus that reconstructs a three dimensional shape of an object in visual hull.

Figure 1:
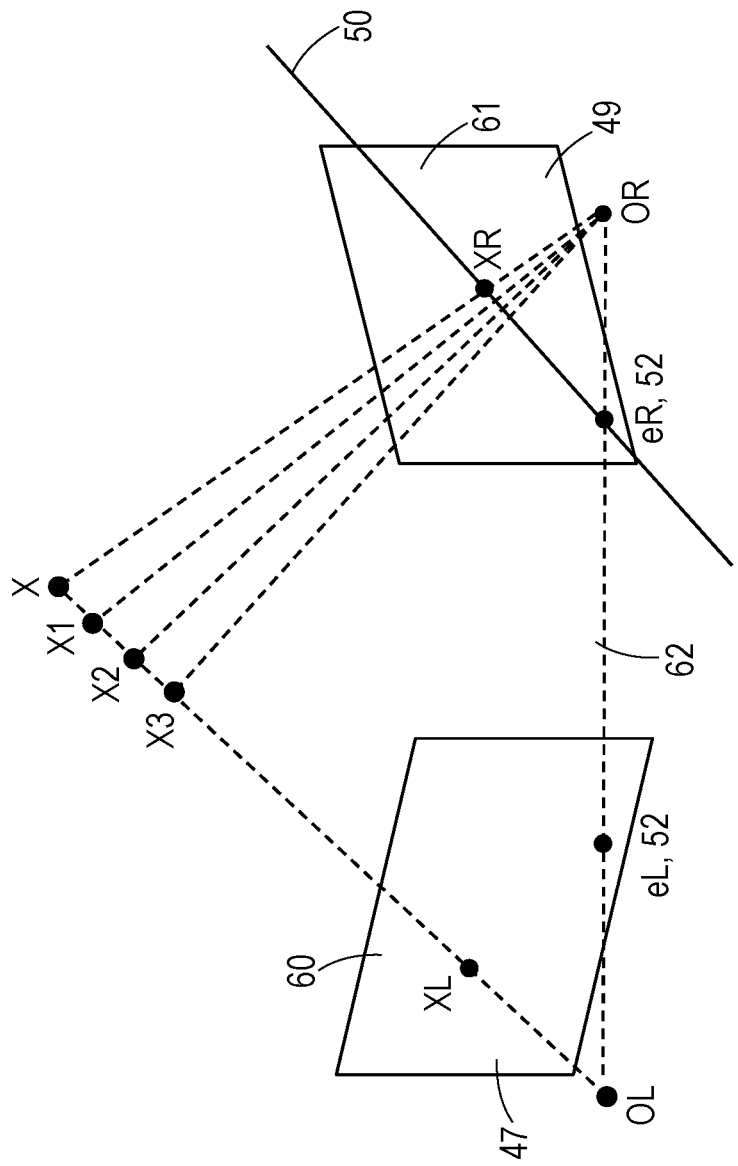
FIG. 1 is a schematic perspective illustration for explaining epipolar geometry.

FIG. 1 is a schematic perspective illustration for explaining epipolar geometry. The epipolar geometry is geometry for reconstructing, from images from two different viewpoints, three dimensional depth information of an object in the images.

In FIG. 1, a point OL and a point OR are the projection center of an L camera (base camera) and the projection center of an R camera (reference camera), respectively. In FIG. 1, a point XL and a point XR are points (silhouettes) obtained by projecting a point X in a three dimensional space (real space) onto a projection plane 60 of the L camera and a projection plane 61 of the R camera, respectively.

Since these two cameras are located at different three dimensional positions, one of the cameras may view the other camera, and vice versa. In FIG. 1, each of points 52 (a point eL and a point eR) is called an epipole or epipolar point, which is a point on the projection plane of one of the cameras obtained by projecting the other camera (projection center). This means that the point eL on the projection plane 60 of the L camera is a projection point of the projection center OR of the R camera on the projection plane 60 and the point eR on the projection plane 61 of the R camera is a projection point of the projection center OL of the L camera on the projection plane 61. Here, the projection centers (the point OL and the point OR) and the epipoles (the point eL and the point eR) lie on a single straight line in the three dimensional space.

In addition, in FIG. 1, a straight line 50 extending on the projection plane 61 of the R camera is called an epipolar line, which is a straight line obtained by projecting a straight line passing through the point OL and the point X onto the projection plane 61 of the R camera. The epipolar line 50 is equal to the line of intersection between a plane (an epipolar plane 62) including three points, namely, the point X, the projection center OL, and the projection center OR, and a plane including the projection plane 61 of the R camera.

Here, assume that the L camera is a base camera and the R camera is a reference camera. In this case, a point in the three dimensional space corresponding to the point XL on the projection plane 60 of the L camera lies on a straight line passing through the projection center OL of the L camera and the point X. Meanwhile, the point in the three dimensional space corresponding to the point XL on the projection plane 60 of the L camera lies in the epipolar line 50 on the projection plane 61 of the R camera. For example, assuming that the point in the three dimensional space corresponding to the point XL on the projection plane 60 of the L camera is the point X, the point X is projected, on the projection plane 61 of the R camera, to the intersection point (the point XR) between the epipolar line 50 and a line joining the projection center OR and the point X.

If the positional relation between the two cameras is known, the following conditions hold as an epipolar constraint. Given a point XL on the projection plane 60 of the L camera corresponding to the point X, a line segment eR-XR on the projection plane 61 of the R camera is defined. The point XR on the projection plane 61 of the R camera corresponding to the point X lies on the epipolar line 50. For instance, if the three dimensional position corresponding to the point XL on the projection plane 60 of the L camera is a point X1, the point on the projection plane 61 of the R camera corresponding to the point X1 is the intersection point between the epipolar line 50 and the line segment joining the projection center OR and the point X1. In the same manner, if the three dimensional position corresponding to the point XL on the projection plane 60 of the L camera is a point X2 or X3, the point on the projection plane 61 of the R camera corresponding to the point X2 or X3 is the intersection point between the epipolar line 50 and the line segment joining the projection center OR and the point X2 or X3.

In an opposite manner, given a point XR on the projection plane 61 of the R camera corresponding to the point X, a line segment eL-XL (not illustrated) on the projection plane 60 of the L camera is defined. Thus, a point on a straight line passing through the projection center OR of the R camera and the point X appears in an epipolar line (not illustrated) passing through the point eL and the point XL on the projection plane 60 of the L camera.

As described above, when the two cameras captures the same point, that point appears in the epipolar lines of the two cameras without exception. In other words, when a point on one of the projection planes does not appear in the epipolar line extending on the other projection plane, the two cameras do not capture the same point (the correspondence is wrong). Accordingly, where a point viewed by one of the cameras is captured on the other camera may be found by only searching the data on the epipolar line of the other camera. If the correspondence is correct and the positions of the point XL and the point XR are known, the position of the point X in the three dimensional space, may be determined according to trigonometry. An information processing apparatus (three dimensional shape reconstruction apparatus) of the present embodiment performs a line segment search based on the epipolar constraint described above, and reconstructs a three dimensional shape of an object from multi-viewpoint videos.

Figure 2A:
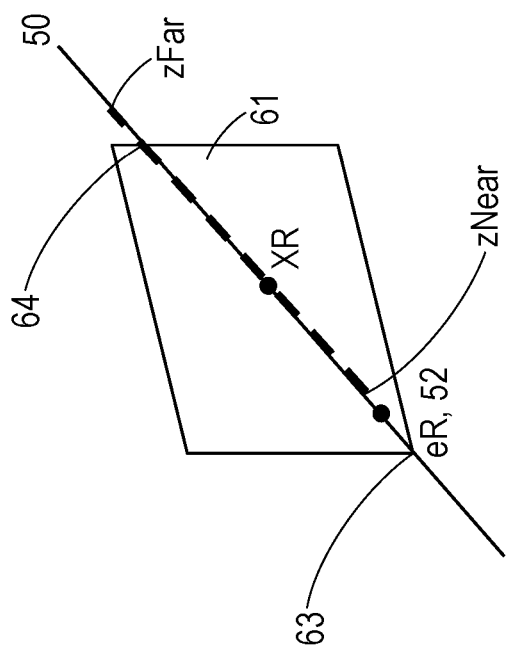
FIGS. 2A and 2B are schematics perspective illustration for explaining a line segment search.
Figure 2B:
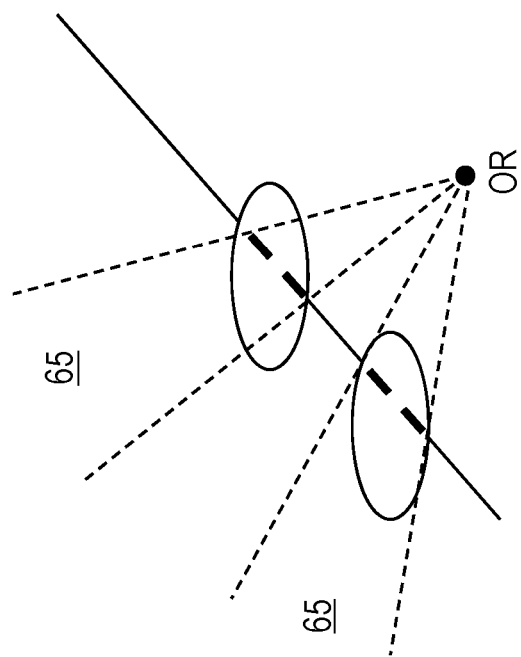

FIGS. 2A and 2B are schematic perspective illustrations for explaining a line segment search.

FIG. 2A illustrates an example of a range, of the epipolar line 50 extending on the projection plane 61 of the R camera, to be searched by a line segment search (intersection point search) to determine whether a silhouette cone exists or not. The line segment search is performed within a range from Max (zNear or a window end Near 63) to Min (zFar or a window end Far 64). The Max (zNear or the window end Near 63) indicates one of the point zNear and the window end Near 63 having a larger value, and the Min (zFar or the window end Far 64) indicates one of the point zFar and the window end Far 64 having a smaller value. Here, the point zNear is the point nearest to the epipolar point eR (52) in the field of view, and the point zFar is the point farthest from the epipolar point eR (52) in the field of view. Meanwhile, the window end Near 63 and the window end Far 64 respectively indicate one and another ends of the projection plane 61, namely, a zNear-side end and a zFar-side end of the projection plane 61 which intersect the epipolar line 50.

FIG. 2B illustrates an example of silhouette cones 65 derived from a line segment search result. The silhouette cone is a cone (visual cone) obtained in such a way that a two dimensional silhouette of an object captured from a certain viewpoint is projected into a real space. Each silhouette cone 65 is derived by: searching for a silhouette existing range on the epipolar line 50 by the above-described line segment search; and projecting the silhouette existing range into the real space with the projection center OR set as the viewpoint. In FIG. 2B, a solid straight line extending upward toward the right is a projection line of the epipolar line 50 in the real space, and sections in the solid straight line depicted by broken lines and traversing the insides of the silhouette cones 65 correspond to the surface of a three dimensional object and its background viewed from the R camera.

The reconstruction of a three dimensional shape of an object from multi-viewpoint videos is achieved by the visual hull using the above-described silhouette cones. In the visual hull, the three dimensional shape of the object is determined based on cross multiply (a visual hull) of silhouette cones respectively derived from multiple viewpoints. In this case, a line segment end of a line segment representing the silhouette existing range detected by the line segment search on the epipolar line 50 may be treated as a candidate for a surface (depth) of a three dimensional object. The surface (depth) of the three dimensional object is a point representing the surface of the object seen from the viewpoint (the projection center) of the base camera. The surface of the three dimensional object in the case where the L camera is set as the base camera is the point nearest to the projection center OL out of points to which the borders (line segment ends) of the silhouette cone are projected on the straight line passing through the projection center OL and the point XL.

In the reconstruction of a three dimensional shape of an object from object silhouette images in multi-viewpoint videos, a surface (depth) of the three dimensional object from each of multiple viewpoints is determined with the corresponding one of the multiple projection centers set as the viewpoint of the base camera, and thereby the three dimensional object is carved.

Figure 3:
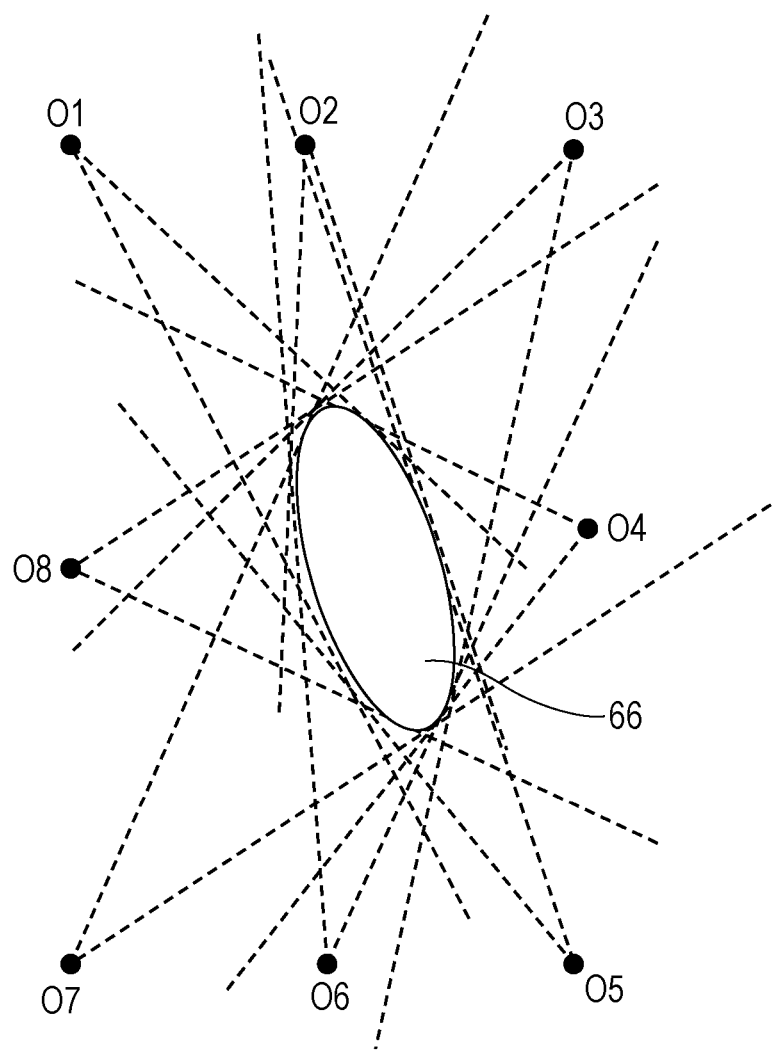
FIG. 3 is a schematic image diagram for explaining the carving of a three dimensional object.

FIG. 3 is a schematic image diagram for explaining the carving of a three dimensional object.

FIG. 3 illustrates a visual hull of eight silhouette cones of a same object 66 in videos captured from eight viewpoints O1 to O8, respectively. In the reconstruction of the three dimensional shape of the object 66 by the visual hull, the surface (depth) of the three dimensional object is determined with each of the viewpoints O1 to O8 set as the viewpoint of the base camera. For example, when the viewpoint O1 is set as the viewpoint of the base camera, the depth of each point is determined within a partial area viewable from the viewpoint O1 in the entire surface of the oblong object 66 in FIG. 3. Similarly, for example, when the viewpoint O5 is set as the viewpoint of the base camera, the depth of each point is determined within a partial area viewable from the viewpoint O5 in the entire surface of the object 66 in FIG. 3. In this way, the surfaces of the object 66 obtained with the multiple viewpoints O1 to O8 set as the viewpoint of the base camera are determined and superimposed one on top of another, so that the three dimensional position of the entire surface of the object 66 is determined. Therefore, the three dimensional shape position of the three dimensional object 66 may be determined (carved).

A three dimensional shape of an object reconstructed from multi-viewpoint videos is usable, for example, for generating an image of the object viewed from any viewpoint (i.e., a free viewpoint image).

FIGS. 4A, 4B, and 4C are diagrams for explaining a method of generating an image of an object from free viewpoints.

FIG. 4A illustrates an example of a positional relation between two objects 67A and 67B reconstructed from multi-viewpoint videos and viewpoints of images to be generated (human viewpoints) H1 and H2 in the three dimensional space. When the two objects 67A and 67B are reconstructed from the multi-viewpoint videos, the three dimensional position of every point in the surface of each of the objects is already figured out and therefore the positional relation between the two objects 67A and 67B is also already figured out. Thus, use of the reconstructed three dimensional shapes of the objects enables generation of an image of the objects viewed from any viewpoint. For example, in the case where the objects 67A and 67B are seen from the human viewpoint H1 in FIG. 4A, the object 67B is seen behind the object 67A as if the object 67A were superimposed on the object 67B. For this reason, in the case of generating an image of the objects 67A and 67B seen from the human viewpoint H1, the silhouettes of the objects 67A and 67B seen from the human viewpoint H1 are rendered with colors (textures) corresponding to their object surfaces and thereby an image 71 as illustrated in FIG. 4B is generated.

In another example, in the case where the objects 67A and 67B are seen from the human viewpoint H2 in FIG. 4A, the object 67A and the object 67B are seen as if they were arranged on the left and right sides. For this reason, in the case of generating an image of the objects 67A and 67B seen from the human viewpoint H2, the silhouettes of the objects 67A and 67B seen from the human viewpoint H2 are rendered with the colors (textures) corresponding to their object surfaces and thereby an image 72 as illustrated in FIG. 4C is generated.

Hereinafter, an embodiment is described in detail with reference to the drawings.

Figure 5:
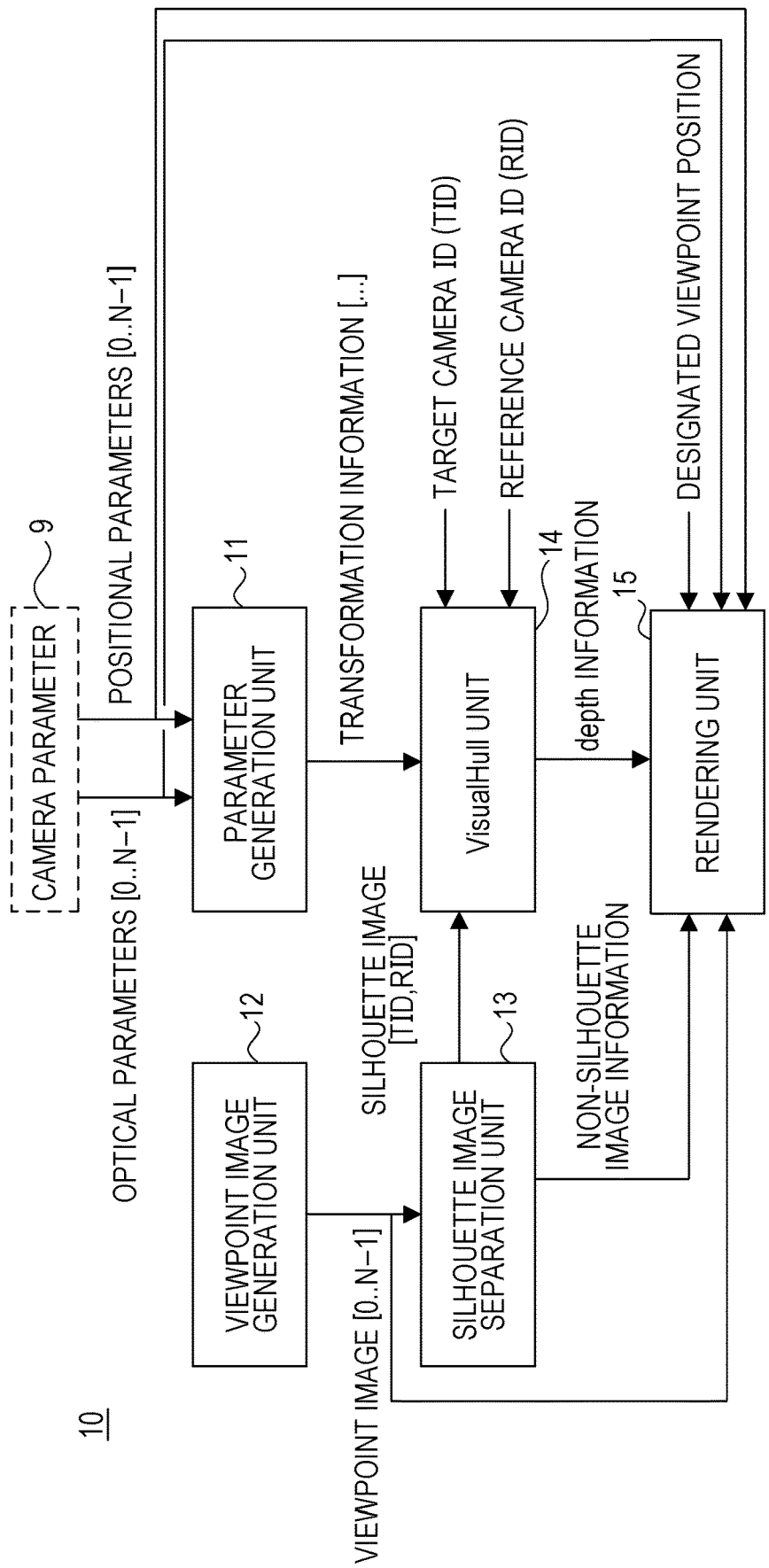
FIG. 5 is a configuration diagram of an information processing apparatus according to an embodiment.

FIG. 5 is a configuration diagram of an information processing apparatus according to an embodiment.

An information processing apparatus 10 in FIG. 5 is an apparatus having a function to reconstruct the three dimensional shape of an object from multi-viewpoint videos in accordance with the visual hull. The information processing apparatus 10 includes a parameter generation unit 11, a viewpoint image generation unit 12, a silhouette image separation unit 13, a visual hull unit 14, and a rendering unit 15.

The viewpoint image generation unit 12 generates images captured from multiple different viewpoints (viewpoint images). For example, the viewpoint image generation unit 12 generates N viewpoint images by extracting the frames at the same time point from among respective videos contained in videos respectively captured from N viewpoints.

The silhouette image separation unit 13 extracts and separates a silhouette image of an object (subject) from each of the viewpoint images generated by the viewpoint image generation unit 12.

The parameter generation unit 11 generates types of parameters (transformation information) by acquiring optical parameters [0 . . . N−1] and positional parameters [0 . . . N−1] from a camera parameter 9.

The visual hull unit 14 acquires a silhouette image in a viewpoint image captured by the target camera and a silhouette image in a viewpoint image captured by the reference camera from the silhouette image separation unit 13. In addition, the visual hull unit 14 acquires an ID specifying the target camera (a target camera ID (TID)) and an ID specifying the reference camera (a reference camera ID (RID)). Moreover, the visual hull unit 14 acquires the transformation information generated by the parameter generation unit 11. The visual hull unit 14 calculates depth information (information on the surface of the three dimensional object) by using the TID, the RID, the transformation information, and the silhouette images [TID, RID] thus acquired.

The rendering unit 15 acquires the optical parameters [0 . . . N−1] and the positional parameters [0 . . . N−1]) from the camera parameter 9, and acquires the depth information from the visual hull unit 14. In addition, the rendering unit 15 acquires non-silhouette image information from the silhouette image separation unit 13 and acquires the viewpoint images [0 . . . N−1] from the viewpoint image generation unit 12. Moreover, the rendering unit 15 acquires a designated viewpoint position. The rendering unit 15 generates an image of an object seen from the designated viewpoint position based on the optical parameters, the positional parameters, the depth information, the non-silhouette image information, and the viewpoint images thus acquired.

Figure 6:
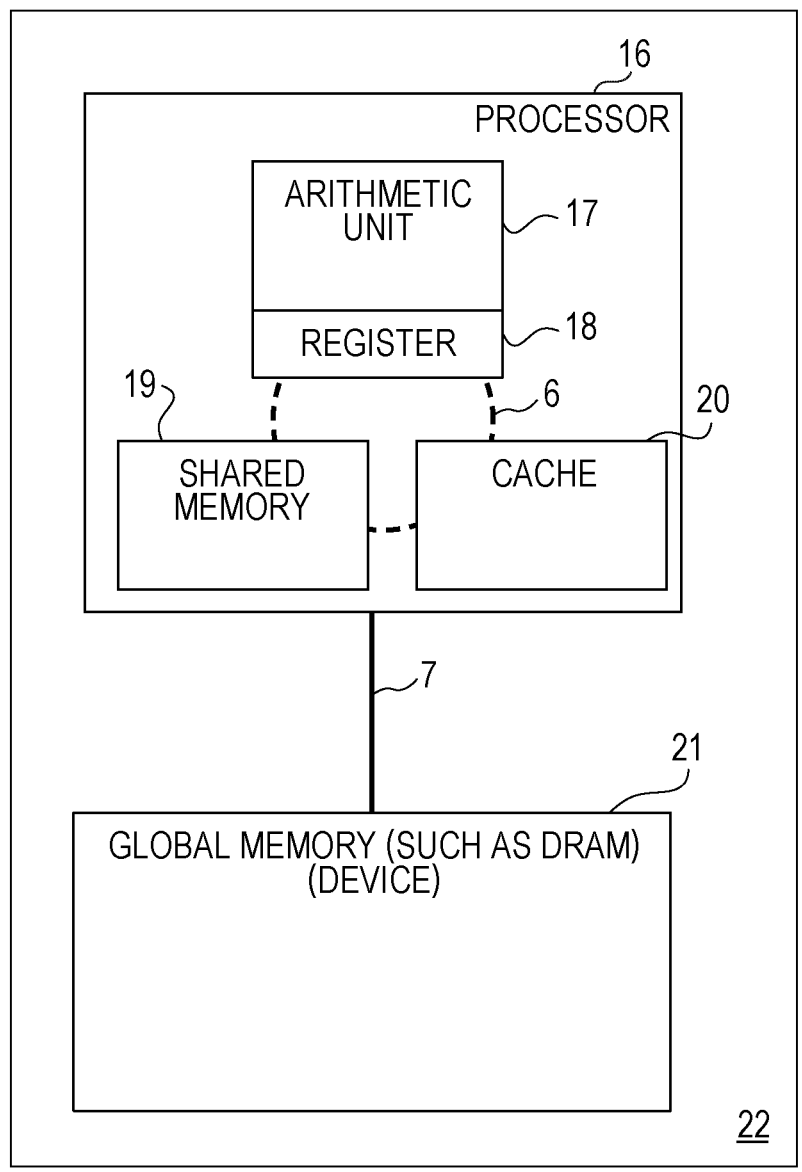
FIG. 6 is a diagram illustrating hardware configuration elements of an information processing apparatus.
Figure 7:
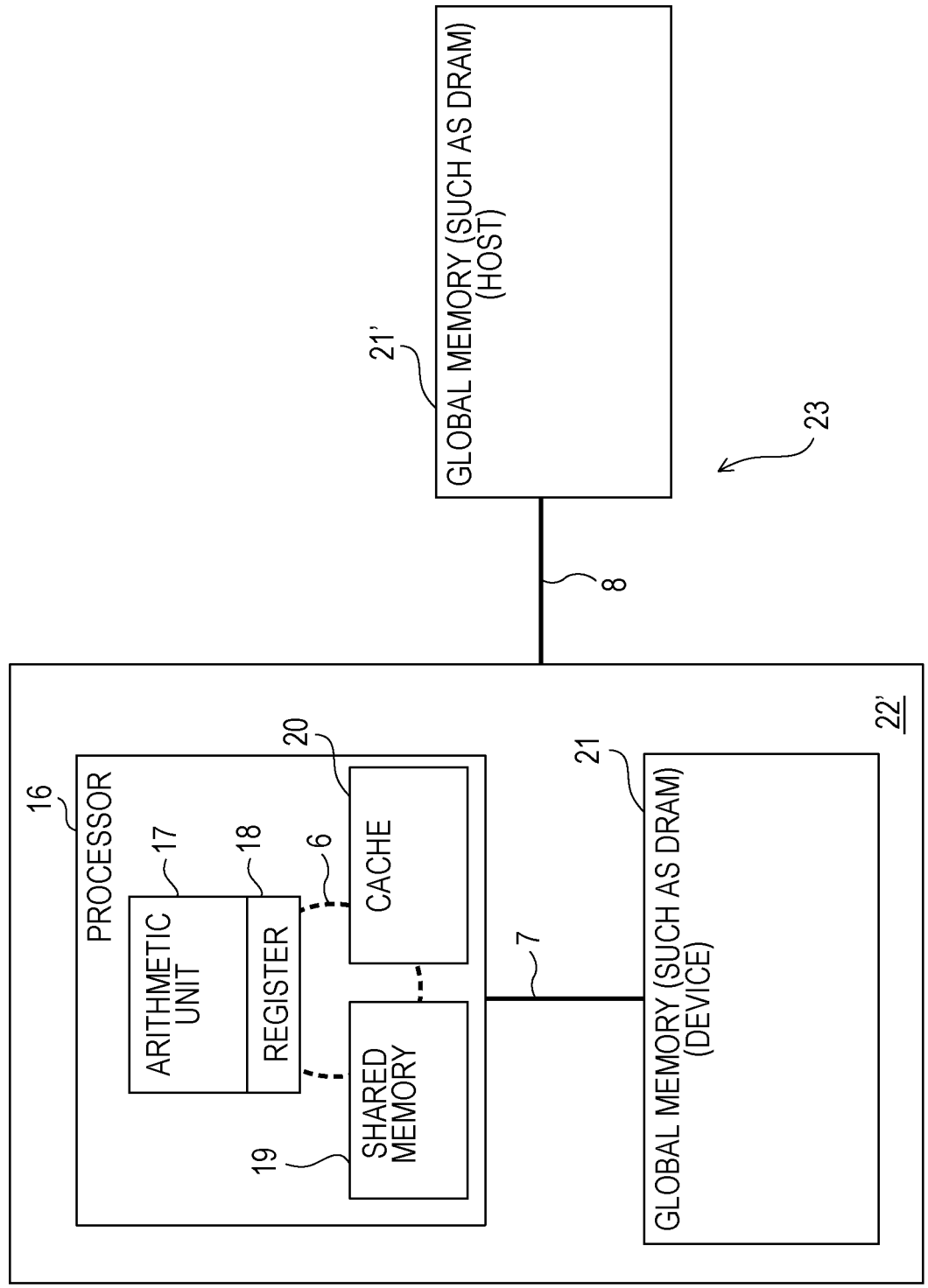
FIG. 7 is a diagram illustrating another example of hardware configuration elements of an information processing apparatus.

The foregoing functional configuration of the information processing apparatus 10 is implemented by, for example, hardware configuration elements as illustrated in FIG. 6 or 7.

FIG. 6 is a diagram illustrating hardware configuration elements of an information processing apparatus. FIG. 7 is a diagram illustrating another example of hardware configuration elements of an information processing apparatus.

As illustrated in FIG. 6, an information processing apparatus 22 includes a processor 16 and a global memory (first memory) 21 such as a dynamic random access memory (DRAM). The processor 16 and the global memory 21 are connected to each other via an inter-chip connection bus 7.

The processor 16 includes an arithmetic unit 17, a register 18, a shared memory (second memory) 19, and a cache 20. The arithmetic unit 17 (the register 18), the shared memory 19, and the cache 20 are connected to each other via an intra-chip bus 6.

Here, if the processor 16 includes a GPU, a global memory 21' located on a host side when viewed from an accelerator processing unit 22' including the processor 16 is connected by an expansion bus 8 (for example, PCI-Express) having a narrower transmission band than the inter-chip connection bus 7 has, as illustrated in an information processing apparatus 23 in FIG. 7.

Moreover, the information processing apparatus 22, 23 (the information processing apparatus 10) may optionally include an input device and an output device not illustrated.

The information processing apparatus 22, 23 may be implemented by, for example, a computer.

The processor 16 may be any processing circuit including any one of a central processing unit (CPU) and a GPU. The processor 16 is capable of executing a program stored in an external storage device, for example.

The shared memory 19, the cache 20, and the global memory 21, 21' store data obtained by operations by the processor 16 and data to be used in processing by the processor 16 as appropriate. Here, these various kinds of data may be stored in a portable recording medium to and from which data may be written and read by a medium driving device.

The input device is implemented as, for example, a keyboard and a mouse, and the output device is implemented as a display or the like.

The information processing apparatus 22, 23 may further include a network connection device not illustrated. The network connection device is usable for communications with another apparatus and operates as a collection unit or an instruction unit.

Moreover, the information processing apparatus 22, 23 may further include a medium driving device not illustrated. The medium driving device is capable of outputting data in the shared memory 19, the cache 20, the global memory 21, 21', and the external storage device to portable recording media, and reading programs, data, and so on from portable recording media. The portable recording media may be any portable storage media including a floppy disk, a magneto-optical (MO) disk, a compact disc recordable (CD-R), and a digital versatile disc recordable (DVD-R).

The processor 16, the global memory 21, 21', the input device, the output device, the external storage device, the medium driving device, and the network connection device are connected to each other via, for example, a bus not illustrated so that they may exchange data between them. The external storage device stores programs and data and provides stored information to the processor 16 and others as appropriate.

The arithmetic unit 17 in the processor 16 reads information stored in the shared memory 19, the cache 20, and the global memory 21, 21' and performs predetermined arithmetic processing. The shared memory 19, the cache 20, and the global memory 21, 21' functioning as storages for storing information have the features presented below in Table 1.

TABLE 1

| ARITHMETIC UNIT 17 | | |
| --- | --- | --- |
| INTRA-CHIP BUS 6 | SHARED MEMORY 19 SMALL POSSIBLE | CAPACITY ALLOCATION CONTROL BY USER |
| INTRA-CHIP BUS 6 | CACHE 20 SMALL (CONTROLLED BY CACHE MANAGEMENT MECHANISM) | CAPACITY ALLOCATION CONTROL BY USER |
| INTER-CHIP CONNECTION BUS 7 | GLOBAL MEMORY 21, 21' LARGE POSSIBLE | CAPACITY ALLOCATION CONTROL BY USER |

The shared memory 19 and the cache 20 are connected to the arithmetic unit 17 via the intra-chip bus 6, and the global memories 21 and 21' are connected to the arithmetic unit 17 via the inter-chip connection bus 7 and expansion bus 8. For this reason, the arithmetic unit 17 may read information from any of the shared memory 19 and the cache 20 with a smaller delay (latency) than a delay in information reading from the global memories 21 and 21'.

However, the shared memory 19 and the cache 20 each have a smaller capacity than the global memory 21 has. In addition, the allocation of the shared memory 19 and the global memory 21 may be controlled by a user, while the allocation of the cache 20 is controlled by a cache management mechanism. Since data operation on the cache 20 is performed for each certain memory unit (cache line) in the global memory in principle, the cached data is less frequently renewed as the locations of addresses to be operated for a short period of time are closer to each other. On the other hand, in data operation on the cache 20, the cached data is more frequently renewed as the locations of addresses to be operated for a short period of time are farther from each other. In the latter operation, an access to the global memory occurs with a higher possibility.

In the line segment search performed by the visual hull unit 14 (see FIG. 1), data of information on pixels in silhouette images as the reference images is read from the global memory 21 that retains silhouette image data (hereinafter, sometimes simply referred to as "silhouette image"). The volume of data used for each silhouette image is determined depending on an image resolution. The image resolution recently required tends to be high (for example, 4K or 8K), and the data size of the silhouette image is accordingly large. A silhouette image with a large data size is not stored in the shared memory 19 or the cache 20, but is retained on the global memory 21.

In visual hull processing performed by the visual hull unit 14, a straight line joining the viewpoint and each foreground pixel of a target image is projected as an epipolar line onto each reference image, and a line segment at which the projected epipolar line intersects the foreground pixel of the reference image is searched out (line segment end search). In this search, for the same target image, the same number of epipolar lines as the number of overlaps in the visual hull are mapped to a common coordinate system to inspect an overlap level of the line segments (line segment overlap inspection), then a range in which the line segments satisfy a required number of overlaps is recognized as a range where the three dimensional object exists, and eventually the position nearest to the viewpoint among the positions of the line segment ends at each of which the three dimensional object is recognized as existing is determined as a distance from the viewpoint. In other words, the line segment end search processing for each epipolar line has no dependent relation with data in the line segment end search processing for another epipolar line, and the line segment end search processing may be performed in parallel processes.

In the case of parallel processes, especially, each parallel unit (for example, a thread) is allowed to use only a smaller memory size in the shared memory 19, and therefore the parallel processes require a highly efficient method of caching silhouette image data.

As a possible example of the related art, there is a method in which the arithmetic unit 17 reads mask pixels required for arithmetic directly from the global memory 21. In this case, the latency in reading is long when the arithmetic unit 17 accesses the global memory 21 for the first time because the silhouette pixels are not stored in the cache 20. Meanwhile, in most cases, the epipolar line is not horizontal on the reference image, and consecutive memory addresses are not accessed in the line segment search processing. A usual arithmetic apparatus has a function that enables a memory access mechanism to optimally access data in memory accesses to consecutive addresses or in a certain regular pattern. However, this function does not work in the line segment end search.

Therefore, the information processing apparatus 10 according to the present embodiment solves the above-described problem as follows.

Instead of oblique memory accesses (non-consecutive address accesses), consecutive accesses are performed such that the memory access mechanism may optimally access data. In this solution, partial data read from the silhouette pixel data and stored in the shared memory 19 is formatted and held temporarily, which enables the arithmetic unit 17 to access the held data with a short latency in line segment end searches.

In order for consecutive accesses to be performed instead of oblique memory accesses, data with a certain wide width in an address direction has to be read. For this reason, a memory access to the global memory 21 is performed in such a way as to read a rectangular area of two-dimensionally arranged image data and the read image data is stored in the cache 20. In this case, if the data stored in the cache 20 is abandoned just after the data stored in the cache 20 is used only for a single epipolar line or is used only to process the epipolar line without any basis (in order to allocate an area in the cache memory required at the start of a line segment end search for another epipolar line), such operation is inefficient because the same partial data of the silhouette pixel data may be read multiple times from the global memory 21. If an access to a certain silhouette pixel is not the first access, the data may possibly exist in the cache 20. This means that a cache line to be accessed (information on multiple pixels consecutive in the horizontal direction in the silhouette image) may be contained in the cache line of the silhouette pixels stored in the cache 20. However, in the above operation, the data existing in the cache 20 is deleted from the cache 20 at every access to the silhouette image, which disables an effective operation from being achieved. This problem becomes more prominent as the resolution of an image becomes higher.

In other words, it is desired to allocate a memory for a rectangular area to the shared memory 19 for the purpose of avoiding inefficient oblique accesses and to complete the line segment end searches concerning epipolar lines using the mask pixels in the rectangular area within a period in which the data exists in the shared memory 19.

For the purpose of effectively using data stored in the shared memory 19 as described above, the information processing apparatus 10 in the present embodiment determines which epipolar lines are included in each of groups in parallel processes, and determines a range of data required by each of the groups.

Figure 8:
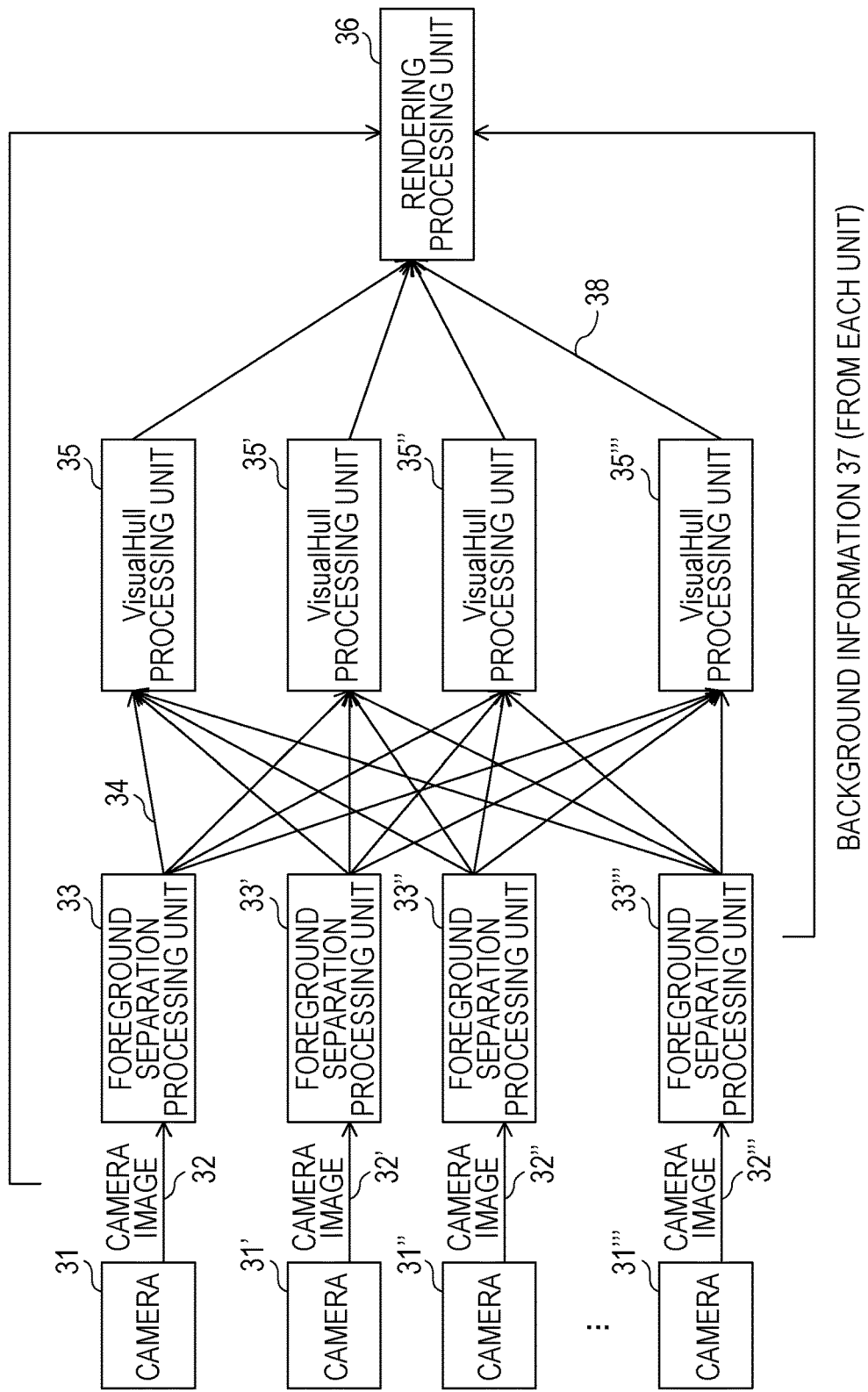
FIG. 8 is a block diagram illustrating a free viewpoint video creation apparatus according to an embodiment.

FIG. 8 is a block diagram illustrating a free viewpoint video creation apparatus according to an embodiment. A free viewpoint video creation apparatus 30 illustrated herein is an apparatus that creates a video (free video) from a particular viewpoint in a three dimensional space, and is included in the information processing apparatus 10.

As illustrated in FIG. 8, the free viewpoint video creation apparatus 30 includes foreground separation processing units 33, 33' . . . , visual hull processing units 35, 35' . . . , and a rendering processing unit 36.

The free viewpoint video creation apparatus 30 acquires multiple camera images 32, 32' . . . respectively captured by multiple cameras 31, 31' . . . arranged around a region to be captured.

The foreground separation processing units 33, 33' . . . of the free viewpoint video creation apparatus 30 generate mask images 34 from the respectively camera images 32, 32' . . . The mask image 34 is composed of pixels to be treated as the foreground in processing by each of the visual hull processing units 35, 35' . . . Each of the foreground separation processing units 33, 33' . . . generates a silhouette image (mask image) 34 from a predetermined camera image among the multiple camera images 32, 32' . . . Moreover, each of the foreground separation processing units 33, 33' . . . generates background information (non-silhouette image information) 37 to be required for synthesis in the rendering processing unit 36. The foreground separation processing units 33, 33' . . . in FIG. 8 are just an example of a foreground separation processing unit in the free viewpoint video creation apparatus 30. Instead of providing the foreground separation processing units respectively for camera images, a single processing unit may be provided which generates silhouette images 34 and background information 37 sequentially from all the respective camera images 32, 32' . . . .

Each of the visual hull processing units 35, 35' . . . sets, as the target camera, one of the multiple cameras 31, 31' . . . in such an exclusive manner that the one camera is not set as the target camera redundantly by any of the other visual hull processing units and performs the visual hull processing based on the silhouette images 34. For example, the visual hull processing unit 35 in FIG. 8 performs the visual hull processing with the camera 31 among the multiple cameras 31, 31' . . . set as the target camera and the other cameras 31' . . . set as the reference cameras. In this case, for example, the visual hull processing unit 35' performs the visual hull processing with another one (for example, the camera 31') of the multiple cameras except for the camera 31 set as the target camera and the other cameras set as the reference cameras. The visual hull processing units 35, 35' . . . in FIG. 8 are just an example of a visual hull processing unit in the free viewpoint video creation apparatus 30. Instead of providing the visual hull processing units respectively for multiple cameras, a single processing unit may be provided which iterates the visual hull processing with one of the multiple cameras set as the target camera, while changing the target camera from one camera to another.

The rendering processing unit 36 generates an image of an object viewed from a particular viewpoint based on processing results (depth data 38) in the visual hull processing units 35, 35' . . . , the camera images 32, 32' . . . , and the background information 37. The rendering processing unit 36, for example, selects several target viewpoints from multiple target viewpoints, and determines positional relation between objects from a particular viewpoint based on the camera images, the background information 37, and the depth data 38 of the selected viewpoints. Then, the rendering processing unit 36 synthesizes the foreground and the background according to the positional relation thus determined, and determines a pixel value of each foreground pixel based on the camera image to decide the color of the pixel. The processing described above generates a three dimensional image from a particular viewpoint designated by the user.

The free viewpoint video creation apparatus 30 in FIG. 8 has a structure in which the processing units perform parallel processes on their respective camera images (respective target viewpoints), but the number of processing units and others are not limited to those in this structure. Moreover, the processing performed by the visual hull processing units 35, 35' . . . does not have to use the data of all the target viewpoints as long as the desired accuracy in the carving of the three dimensional shape by the visual hull may be obtained. For example, in the reconstruction of the three dimensional shape of an object, the free viewpoint video creation apparatus 30 may select N−1 or less cameras from all the (N) cameras 31, 31' . . . and reconstruct the three dimensional shape of the object from camera images captured by the selected cameras.

Each of the visual hull processing units 35, 35' . . . performs a line segment search within a range from Max (the zNear or the window end Near) to Min (the zFar or the window end Far) for each of the reference cameras F (F=0 . . . the number of reference cameras−1), and detects a line segment range in which the and of line segments is 1, and which indicates an existing range of the detected silhouette.

Figure 9:
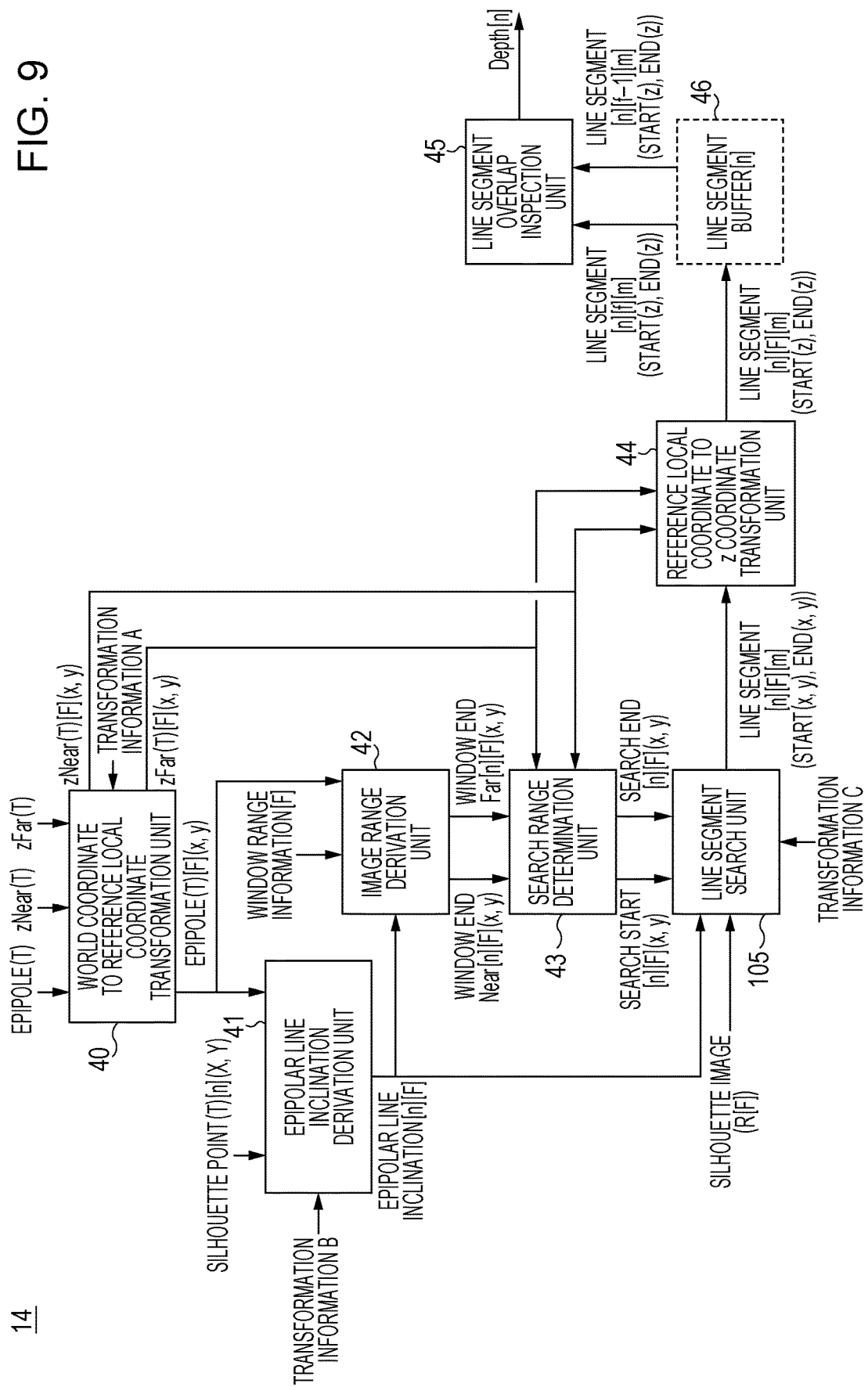
FIG. 9 is a configuration block diagram of a visual hull processing unit.

FIG. 9 is a configuration block diagram of the visual hull unit.

FIG. 9 illustrates a functional configuration of the visual hull unit 14 (see FIG. 1) corresponding to the visual hull processing unit 35, 35' . . . The visual hull unit 14 includes a world coordinate to reference local coordinate transformation unit 40, an epipolar line inclination derivation unit 41, an image range derivation unit 42, a search range determination unit 43, and a line segment search unit 105. The visual hull unit 14 further includes a reference local coordinate to z coordinate transformation unit 44, a line segment buffer [n] 46, and a line segment overlap inspection unit 45.

The world coordinate to reference local coordinate transformation unit 40 transforms existence information indicating an existing position of a silhouette captured by the base imaging device from a world coordinate system to a first coordinate system (reference view coordinate system).

The epipolar line inclination derivation unit 41 acquires i-th (i=1 to n (n: an integer)) existing position information indicating the existing position of a silhouette based on an i-th reference imaging device (reference camera) among multiple reference imaging devices. The epipolar line inclination derivation unit 41 calculates an epipolar line based on the acquired i-th existing position information and information for transformation to the first coordinate system.

The line segment overlap inspection unit 45 detects an overlap section in which line segments overlap each other based on line segment information (for example, stored in the line segment buffer 46) on line segments at each of which the epipolar line and the silhouette intersect each other.

The search range determination unit 43 determines a search range in the line segment information that is to be searched based on the overlap section.

The line segment search unit 105 performs a line segment search based on the determined search range.

Incidentally, as the background knowledge for implementing the present disclosure, reference may be made to Fujimoto et al. for camera coordinate transformation, and reference may be made to Solem, Mizuno et al., and Deguchi for a method of deriving an epipolar line in 2D coordinates of a reference view.

The information processing apparatus 10 in the present embodiment divides epipolar lines into groups in consideration of the epipolar constraint in the epipolar geometry (in other words, determines an optimal prefetch area), and performs a line segment search for each of the groups using data stored in a memory area with a short latency (for example, the shared memory 19). The prefetch mentioned herein is pre-reading and is a function by which data desired by a processor such as a CPU is read and stored into a cache memory in advance.

Figure 10:
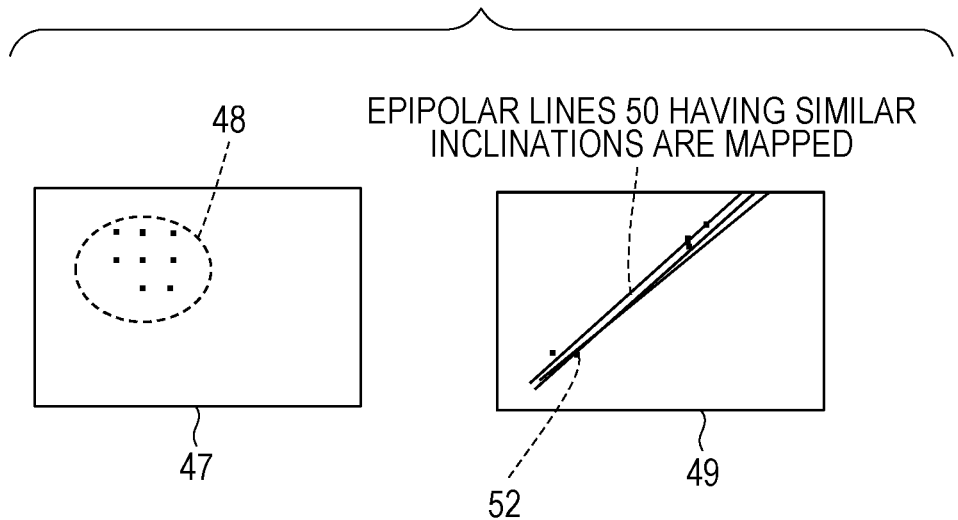
FIG. 10 is an illustrative image diagram presenting multiple epipolar lines of reference views corresponding to neighboring silhouette pixels in a target view.
Figure 11:
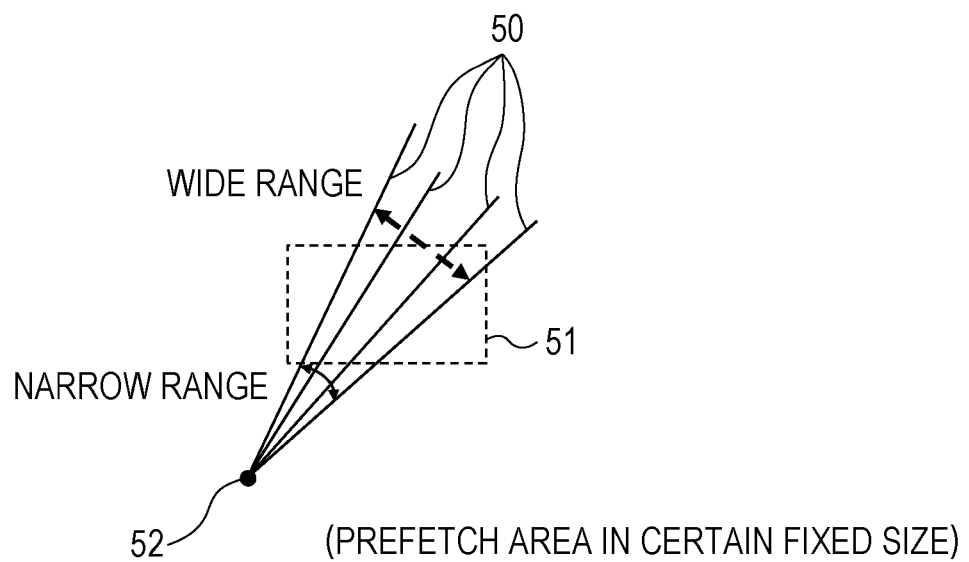
FIG. 11 is an illustrative image diagram presenting a divergence among multiple neighboring epipolar lines in reference views corresponding to neighboring silhouette pixels in a target view.

FIG. 10 is an illustrative image diagram presenting multiple epipolar lines of reference views corresponding to neighboring silhouette pixels in the target view. FIG. 11 is an illustrative image diagram presenting a divergence among multiple neighboring epipolar lines in reference views corresponding to neighboring silhouette pixels in a target view.

As illustrated in FIG. 10, the information processing apparatus 10 projects processing-target neighboring silhouette pixels 48 in the target view 47 onto epipolar lines 50 having similar inclinations in the reference views 49. In this way, the information processing apparatus 10 maps multiple epipolar lines 50 having similar inclinations in the reference views 49 to the neighboring silhouette pixels 48 in the target view 47, and determines a prefetch area 51 (a width and the number of lines in a height).

As illustrated in FIG. 11, the divergence among the neighboring epipolar lines 50 (in other words, a range of the inclinations of the epipolar lines) changes depending on the positions of the epipole 52 and the silhouette pixels in the target view 47, and the prefetch area 51 changes according to a distance from the epipole 52.

Figure 12A:
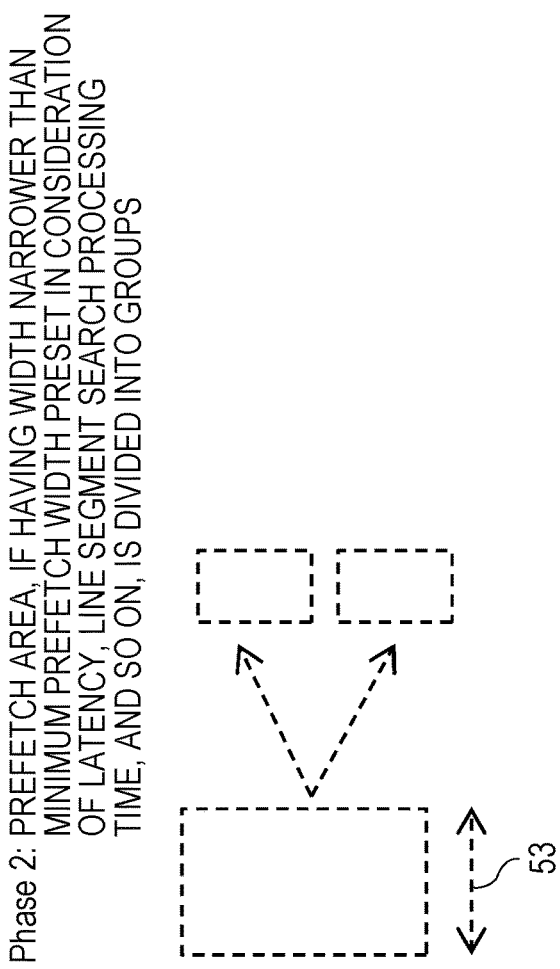
FIGS. 12A and 12B are image diagrams for explaining a change in the prefetch width and the number of lines in a prefetch area and division of a prefetch area into groups.
Figure 12B:
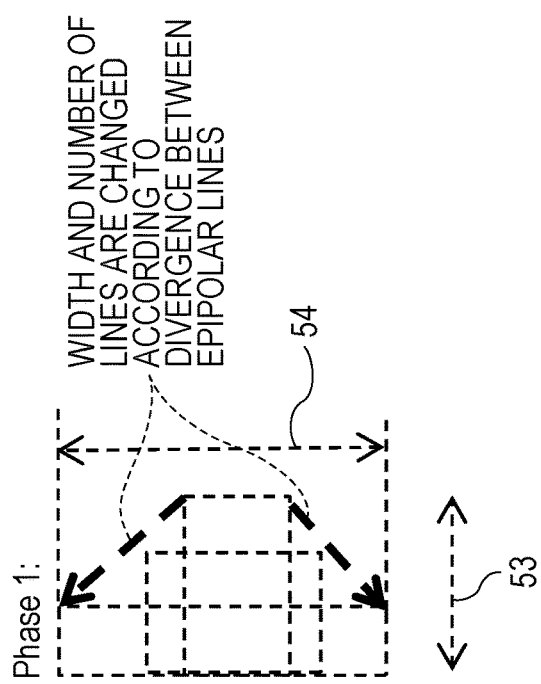

FIGS. 12A and 12B are image diagrams for explaining changes in the prefetch width and the number of lines of the prefetch area and a division of a prefetch area into groups.

As illustrated in FIG. 12A, the prefetch width 53 and the number of prefetch lines 54 are changed according to the divergence among the epipolar lines 50. When any one of the prefetch width 53 and the number of prefetch lines 54 is determined, the other one is determined plainly based on the capacities of the shared memory 19 and the cache 20 (see FIGS. 6 and 7). In addition, as illustrated in FIG. 12B, if the prefetch width 53 determined is narrower than a minimum prefetch width preset in consideration of a memory latency, a line segment search processing time, and so on, the prefetch area 51 is divided into groups.

Figure 13:
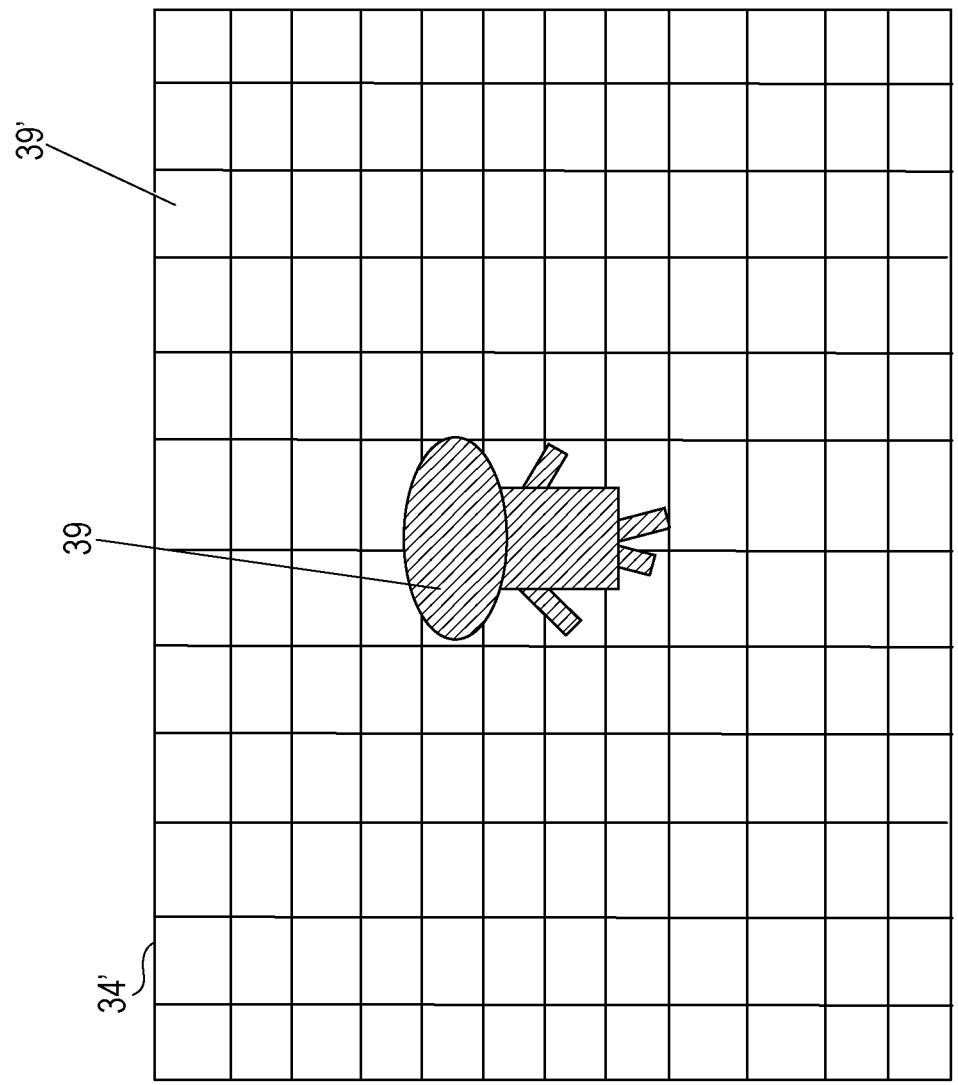
FIG. 13 is a diagram depicting an illustrative silhouette image.

Next, with reference to FIG. 13, description is provided for a specific method of obtaining epipolar lines 50 having similar inclinations in silhouette images. FIG. 13 is a diagram depicting an illustrative silhouette image.

Based on the epipolar line constraint condition that an epipolar line passes through an epipole without exception, epipolar lines having similar inclinations may be said to be epipolar lines passing through neighboring pixels. A conceivable method of obtaining epipolar lines having similar inclinations is a method in which, for example, a silhouette image 34' is divided into certain rectangular areas as illustrated in FIG. 13 and silhouette pixels 39 in each of the rectangular areas are divided in order of rasters (single pixels) by a certain number into groups for threads. Here, each silhouette pixel 39 is a pixel indicating that an object (silhouette) exists. Then, a mask pixel 39' in the silhouette image 34' in FIG. 13 is a pixel indicating that no object (silhouette) exists.

Moreover, if several groups may be formed by dividing a huge number of silhouette pixels in the above grouping, silhouette pixels 39 to be included in each of the groups (within a predetermined range of pixels where an object exists) may be determined in such a way that: how near silhouette pixels 39 are to each other is actually judged from the inclinations of the epipolar lines; and a certain number of silhouette pixels 39 nearest to each other are grouped. Alternatively, the silhouette pixels in the entire silhouette image 34', in place of each of the rectangular areas, may be grouped based on the inclinations of the epipolar lines.

Figure 14:
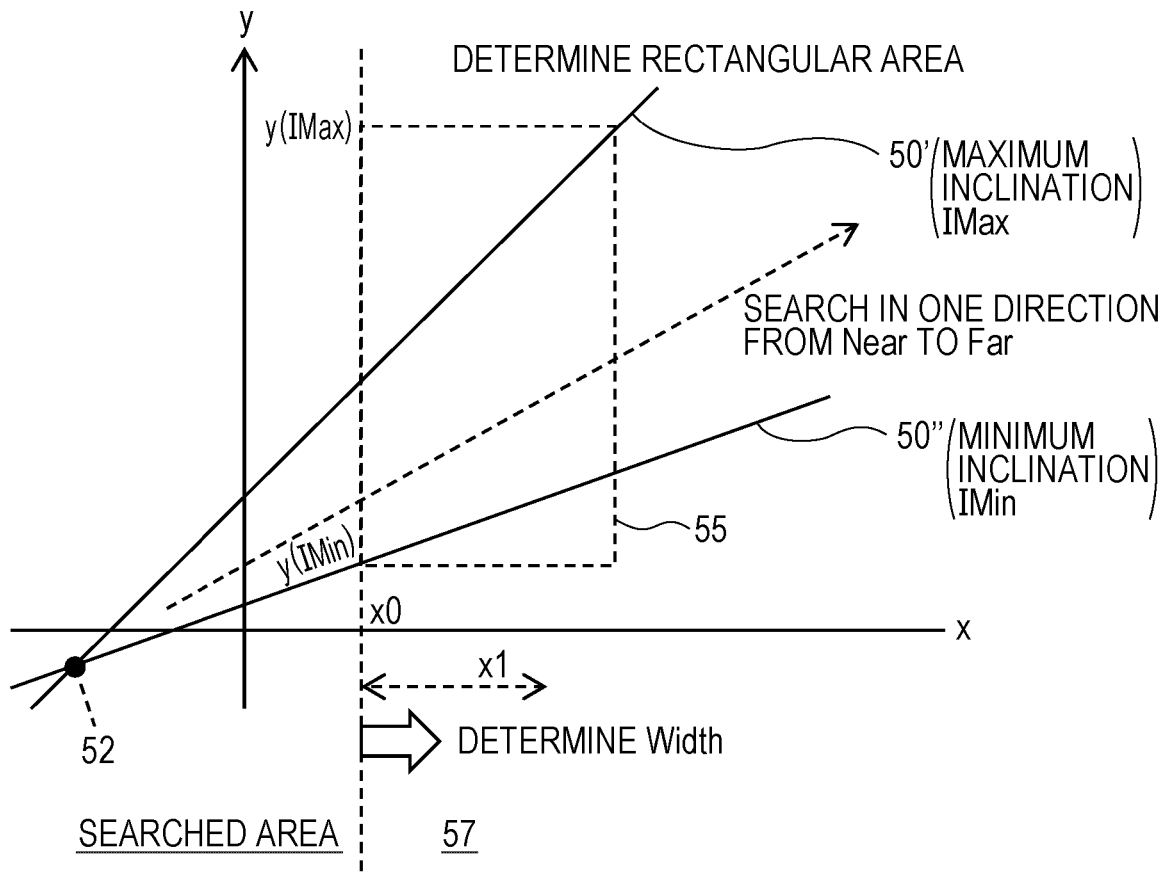
FIG. 14 is an image diagram of a reference view for determining a cache area.

Next, with reference to FIG. 14, description is provided for a method of determining a cache area 55. FIG. 14 is an image diagram of a reference view for determining a cache area.

Under the epipolar geometry constraint condition, an epipolar line (y=a/b*x+c/b) passes through an epipole without exception. For this reason, in the determination of a cache area 55, as illustrated in FIG. 14, two epipolar lines 50' and 50" with a maximum inclination (IMax) and a minimum inclination (IMin) in a search target area are picked up from a group of mapped epipolar lines having similar inclinations, which are to be processed in parallel. The difference between the x values at the IMax and the IMin is set as the prefetch width 53 determined as described above, and the difference between the y values at the IMax and the IMin is set as the number of prefetch lines 54 determined as described above.

Then, as illustrated in FIG. 14, x0 is set as the start location of the search target area 57 and x1 is moved to determine the width of the cache area 55 such that the cache area 55 has a size of (x1−x0)×(y(IMax)−y(IMin)) or larger.

In the determined cache area 55, line segment searches on the two epipolar lines 50' and 50" with the maximum inclination (IMax) and the minimum inclination (IMin) and all the epipolar lines located between them are performed in parallel processes.

In the above determination, the cache area 55 may be divided into groups based on a latency of the shared memory 19 and/or a processing time.

Figure 15:
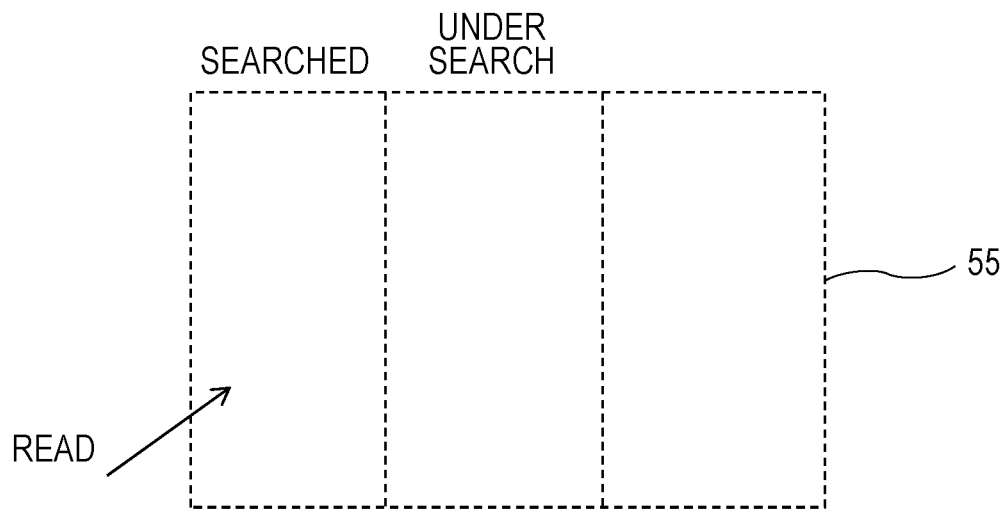
FIG. 15 is an image diagram in the case of reading data in a cache area stepwise.

FIG. 15 is an image diagram in the case of reading data in a cache area stepwise.

For example, a memory access for reading the image data in a memory corresponding to the projection plane 61 in FIG. 2A proceeds line by line in one direction from the window end Near to the window end Far. Accordingly, the prefetch may be performed such that, for example, the data in the cache area 55 is divided into several steps (two or more groups) as illustrated in FIG. 15, and the groups are read (sequentially) in the order from the left to the right. Since the prefetch of data to be used next may be performed in parallel with the line segment search on certain data, the line segment searches may be performed without a wait time for data to be read.

Figure 16:
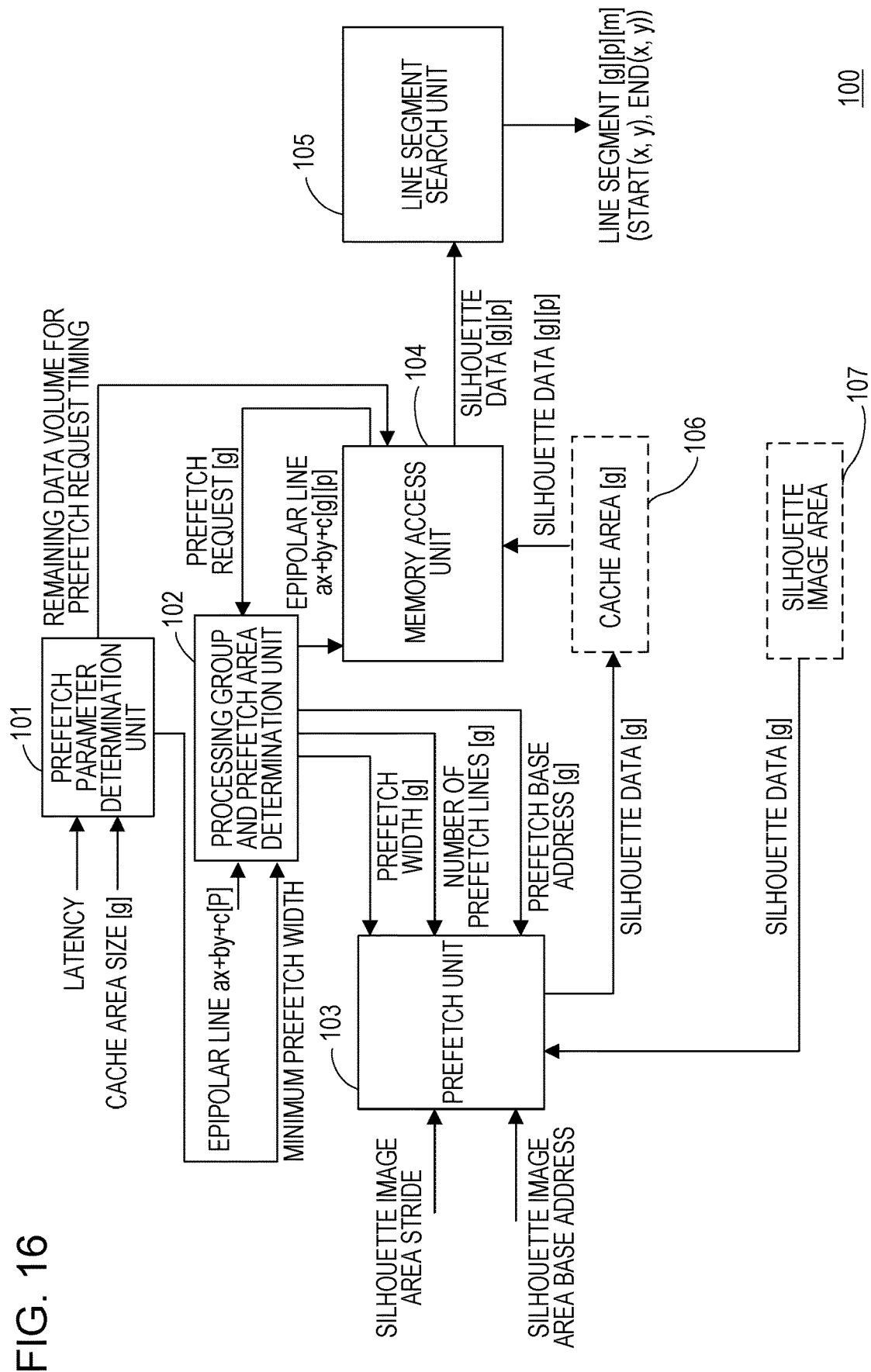
FIG. 16 is a configuration block diagram illustrating an information processing system including an information processing apparatus according to an embodiment.

FIG. 16 is a configuration block diagram illustrating an information processing system including an information processing apparatus according to an embodiment.

As illustrated in FIG. 16, an information processing system 100 includes a prefetch parameter determination unit 101, a processing group and prefetch area determination unit 102, a prefetch unit 103, a memory access unit 104, and a line segment search unit 105.

The prefetch parameter determination unit 101 determines prefetch parameters including a minimum prefetch width based on a latency and a cache area size [g].

The processing group and prefetch area determination unit 102 determines a group of epipolar lines having inclinations within a predetermined range in the images designated as the reference views, based on the positions of the neighboring silhouette pixels in the image designated as the target view. The processing group and prefetch area determination unit 102 determines the group of epipolar lines based on information ax+by+c [P] on all the epipolar lines in the reference views and the minimum prefetch width determined by the prefetch parameter determination unit 101.

The prefetch unit 103 determines a cache area to be used in a line segment search on each of the epipolar lines included in the group based on the determined group and the capacity of the cache, reads partial data in the silhouette image corresponding to the cache area, and stores the read partial data into the cache.

The line segment search unit 105 performs line segment searches on the respective epipolar lines included in the group based on the silhouette image data stored in the cache.

In the information processing system 100 in FIG. 16, prefetch processing is performed by the prefetch parameter determination unit 101, the processing group and prefetch area determination unit 102, and the prefetch unit 103, and line segment search processing is performed by the line segment search unit 105. In the prefetch processing, a partial area (cache area) in the silhouette image to be used in each line segment search is determined, and the cache area is read from the global memory 21 and stored into the cache 20. In the line segment search processing, the part of the silhouette image stored in the cache 20 is read and the line segment search is performed.

Figure 17:
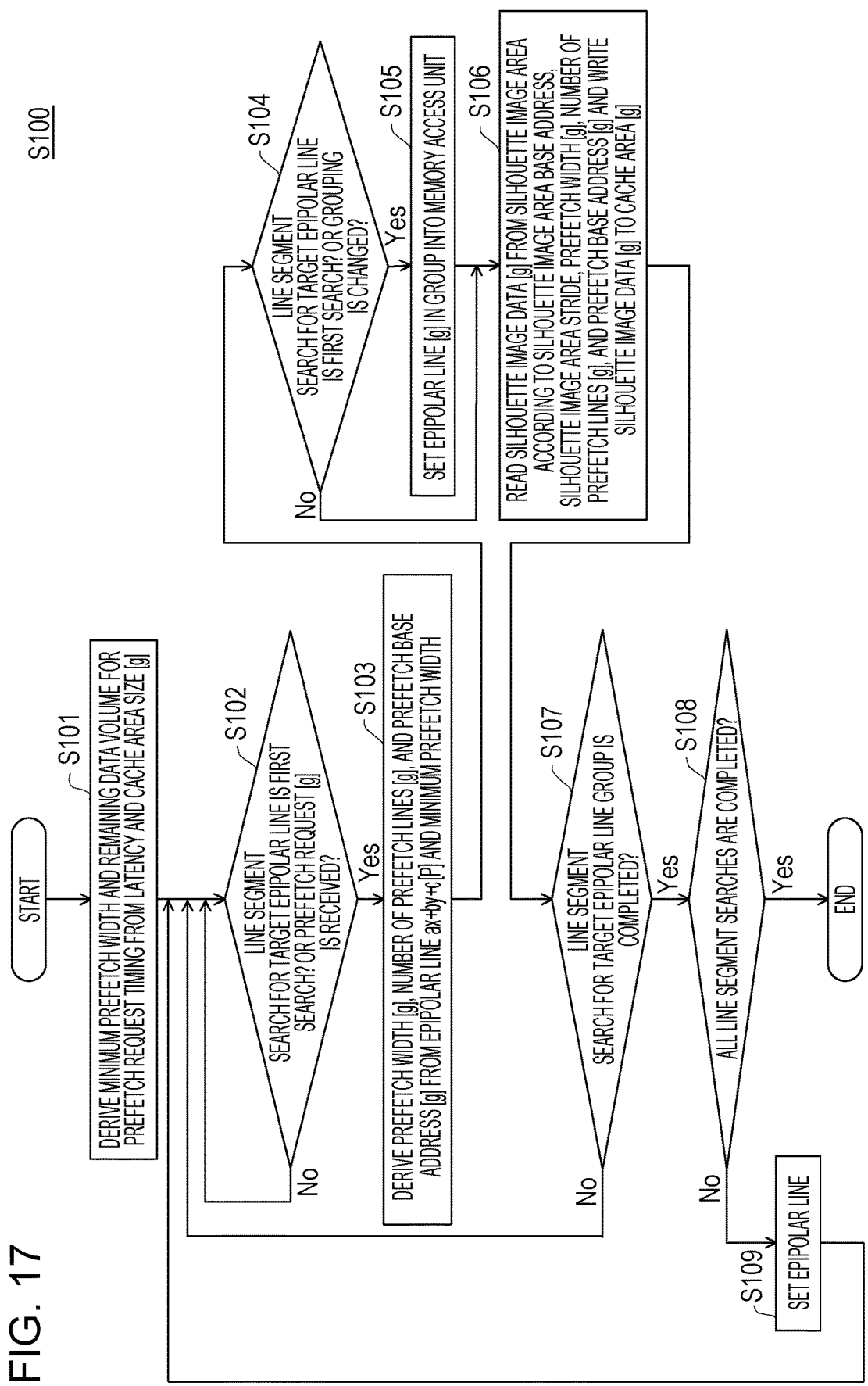
FIG. 17 is a flowchart presenting a prefetch processing flow in an information processing system according to an embodiment.

Next, with reference to FIG. 17, description is provided for a prefetch processing flow S100 in information processing (processing of constructing a three dimensional shape) performed by the information processing system 100 according to the present embodiment.

FIG. 17 is a flowchart presenting a prefetch processing flow in an information processing system according to an embodiment.

In the information processing system 100, first, the prefetch parameter determination unit 101 derives the minimum prefetch width and a remaining data volume for prefetch request timing from the latency and the cache area size [g] (step S101).

Then, the information processing system 100 judges whether or not the line segment search concerning a target epipolar line is a first search or whether or not a prefetch request [g] is received (step S102). If the line segment search concerning the target epipolar line is the first search or the prefetch request [g] is received (step S102; Yes), then the processing group and prefetch area determination unit 102 derives the prefetch width [g], the number of prefetch lines [g], and a prefetch base address [g] from the epipolar line ax+by+c [P] and the minimum prefetch width (step S103). The base address mentioned herein is a start address of a prefetch area.

Meanwhile, if the line segment search concerning the target epipolar line is not the first search or the prefetch request [g] is not received (step S102; No), the information processing system 100 enters a waiting state. In this case, the information processing system 100 makes the judgment in step S102 again at predetermined timing.

After terminating the processing in step S103, the information processing system 100 judges whether or not the line segment search concerning the target epipolar line is the first search or whether or not the grouping of the cache area [g] 106 is changed (step S104). If the line segment search concerning the target epipolar line is the first search or the grouping of the cache area [g] 106 is changed (step S104; Yes), then the processing group and prefetch area determination unit 102 sets the epipolar line [g] in the group into the memory access unit 104 (step S105).

After terminating the processing in step S105, the information processing system 100 performs processing in step S106. Meanwhile, if the line segment search concerning the target epipolar line is not the first search or the grouping is not changed (step S104; No), the information processing system 100 skips step S105 and performs the processing in step S106.

In step S106, the prefetch unit 103 reads silhouette image data [g] by using the base address and the stride of the silhouette image area 107 according to the silhouette image area base address, the silhouette image area stride, the prefetch width [g], the number of prefetch lines [g], and the prefetch base address [g], and writes the silhouette image data [g] to the cache area [g] 106. Here, the silhouette image area stride is a value indicating which data elements in an array of the silhouette image are the start and end of data per horizontal line of the image.

Thereafter, the information processing system 100 judges whether or not the line segment searches concerning the group including the target epipolar line are completed (step S107). If an epipolar line yet to put through a line segment search is left (step S107; No), the information processing system 100 iterates the processing in step S102 and the following steps. Then, when the line segment searches concerning the group including the target epipolar line are completed (step S107; Yes), the information processing system 100 subsequently judges whether or not all the line segment searches are completed (step S108). If all the line segment searches are not completed (step S108; No), the information processing system 100 sets a new epipolar line as a target (step S109) and iterates the processing in step S102 and the following steps. Thereafter, when all the line segment searches are completed (step S108; Yes), the information processing system 100 terminates the prefetch processing flow.

Figure 18:
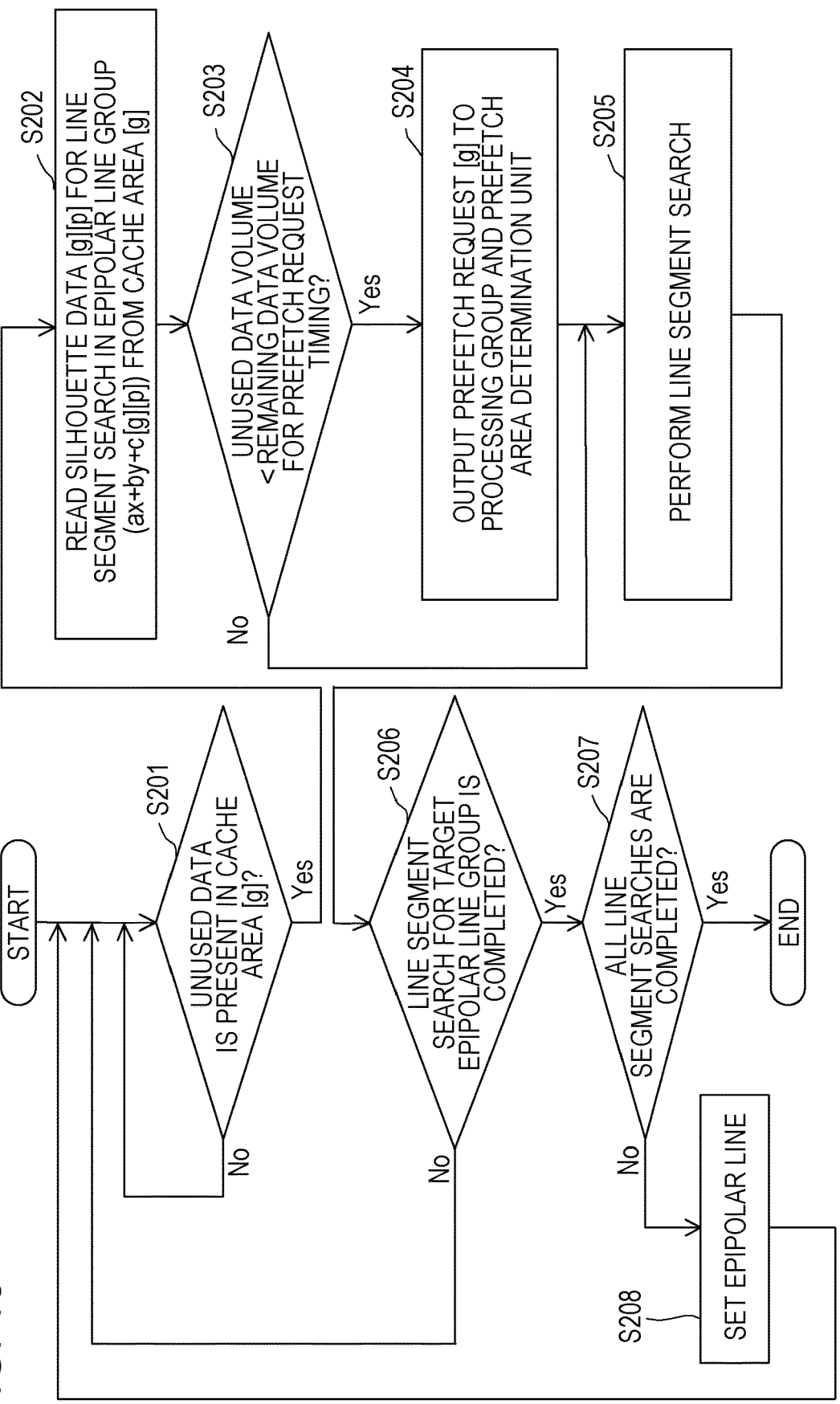
FIG. 18 is a flowchart presenting a line segment search processing flow in an information processing system according to an embodiment.
Figure 19:
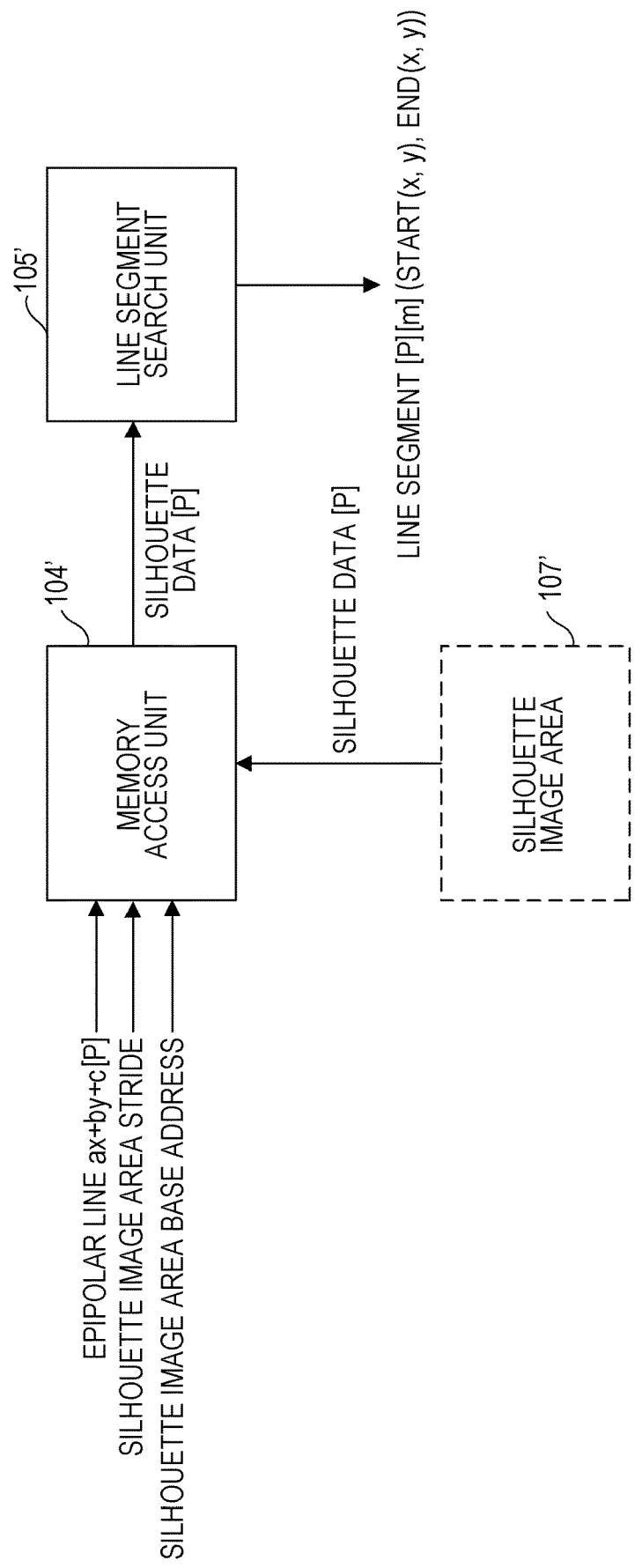
FIG. 19 is a configuration diagram of an information processing apparatus in the related art.

Next, with reference to FIG. 18, description is provided for a line segment search processing flow S200 performed by the information processing system 100 according to the present embodiment.

FIG. 18 is a flowchart presenting a line segment search processing flow in an information processing system according to an embodiment.

First, the information processing system 100 judges whether or not unused data is left in the cache area [g] 106 (step S201). If the unused data is left (step S201; Yes), the memory access unit 104 reads silhouette data [g] [p] for performing line segment searches concerning an epipolar line group (ax+by+c [g] [p]) from the cache area [g] 106 (step S202). Meanwhile, if the unused data is not left (step S201; No), the information processing system 100 enters a waiting state. In this case, the information processing system 100 makes the judgment in step S201 again at predetermined timing.

After terminating the processing in step S202, the information processing system 100 judges whether or not the unused data volume in the cache area [g] 106 is smaller than the remaining data volume for prefetch request timing (step S203). If the unused data volume is smaller than the remaining data volume for prefetch request timing (step S203; Yes), the memory access unit 104 in the information processing system 100 transmits a prefetch request [g] to the processing group and prefetch area determination unit 102 (step S204). Then, after the memory access unit 104 transmits the silhouette data [g] [p] to the line segment search unit 105, the line segment search unit 105 in the information processing system 100 performs a line segment search (step S205). Here, if the unused data volume in the cache area [g] 106 is equal to or larger than the remaining data volume for prefetch request timing (step S203; No), the information processing system 100 skips step S204 and performs the processing in step S205.

After terminating the processing in step S205, the information processing system 100 judges whether or not the line segment searches concerning the target epipolar line group are completed (step S206). If the line segment searches concerning the target epipolar line group are not completed (step S206; No), the information processing system 100 iterates the processing in step S201 and the following steps. Then, when the line segment searches concerning the target epipolar line group are completed (step S206; Yes), the information processing system 100 subsequently judges whether or not all the line segment searches are completed (step S207). If all the line segment searches are not completed (step S207; No), the information processing system 100 sets a new epipolar line as a target (step S208) and iterates the processing in step S201 and the following steps. Thereafter, when all the line segment searches are completed (step S207; Yes), the information processing system 100 terminates the line segment search processing flow.

The information processing system 100 (information processing apparatus 10) according to the present embodiment executes the prefetch processing flow and the line segment search processing flow described above in a collaborative manner, and thereby determines a prefetch area such that neighboring silhouette pixels in the target view may be projected to multiple epipolar lines having similar inclinations in the reference views. In this way, the information processing system 100 (information processing apparatus 10) is enabled to perform line segment searches concerning multiple epipolar lines in each batch by using data stored in a memory having a shorter latency (for example, the shared memory 19) than a latency in oblique accesses to the global memory 21, 21'.

As described above, according to the present embodiment, in consideration of the constraint condition of multiple epipolar lines corresponding to processing-target neighboring silhouette pixels, optimal allocation of parallel processes and an optimal prefetch area may be determined for line segment searches concerning the epipolar lines.

Hence, according to the present embodiment, accesses to consecutive data are performed by accessing a memory having a longer latency such as the global memory 21, 21' and accesses to non-consecutive data are performed by accessing a memory having a shorter latency such as the shared memory 19. Thus, the performance deterioration due to a memory latency may be minimized. Moreover, the present embodiment may exert its own effect particularly in line segment searches performed in parallel processes.

Note that the aforementioned memory access and data cache methods in the line segment search processing are just one example. The line segment search processing according to the present embodiment may include both line segment search processing with data cache to the shared memory 19 and line segment search processing without data cache to the shared memory depending on constraints such as the inclinations of epipolar lines, the method of forming an epipolar line group, and the capacity of the shared memory. In addition, in the line segment search processing according to the present embodiment, epipolar lines may be divided into multiple groups according to the foregoing constraints and so on, and the line segment search processing with data cache to the shared memory 19 and the line segment search processing without data cache to the shared memory may be switched on a group-by-group basis.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus that reconstructs a three dimensional shape of an object from a plurality of images captured from different viewpoints by visual hull, comprising:
   a cache configured to store part of silhouette image data of the object extracted from the images;
   a processor coupled to the cache and configured to:
      determine a group of a plurality of epipolar lines having inclinations within a predetermined range in images designated as reference views among the plurality of images, based on positions of neighboring silhouette pixels in an image designated as a target view among the plurality of images, and
      determine, based on the determined group and a capacity of the cache, a cache area to be used in a search for a line segment indicating a range where the object exists in each of the plurality of epipolar lines in the group, wherein
   the processor determines the cache area based on a position of an epipole at which the plurality of epipolar lines in the group intersect each other, a divergence among the plurality of epipolar lines in an area targeted for line segment searches, and a capacity of the cache.

2. The information processing apparatus according to claim 1, further comprising a first memory configured to store the silhouette image data for the plurality of images, wherein
   the processor reads a part of the silhouette image data corresponding to the cache area from the first memory and stores the read part in the cache.

3. The information processing apparatus according to claim 2, wherein:
   the processor is configured to include the cache; and
   the processor is coupled to the first memory via a bus.

4. The information processing apparatus according to claim 3, wherein:
   the processor includes a second memory configured to store a part of the silhouette image data; and
   the processor divides the cache area into groups based on at least one of a latency and a processing time for the second memory.

5. The information processing apparatus according to claim 1, wherein:
   the processor determines a rectangular area in each of the images as the cache area; and
   when a width of the cache area is narrower than a predetermined width, the processor divides the cache area into a plurality of cache areas.

6. The information processing apparatus according to claim 1, wherein:
   the processor determines a rectangular area in the images as a cache area; and
   when a width of the cache area is wider than a predetermined width, the processor divides the cache area in a width direction into a plurality of partial areas, and stores data of each of the partial areas in the cache stepwise.

7. The information processing apparatus according to claim 1, wherein
   the processor is further configured to search for the line segment indicating the range where the object exists in each of the plurality of epipolar lines in the group, based on the silhouette image data stored in the cache.

8. An information processing method performed by an information processing apparatus that reconstructs a three dimensional shape of an object from a plurality of images captured from different viewpoints by visual hull, the information processing method comprising:
  storing, into a first memory provided for the information processing apparatus, silhouette image data of the object extracted from the plurality of images;
  determining a group of a plurality of epipolar lines having inclinations within a predetermined range in images designated as reference views among the plurality of images, based on positions of neighboring silhouette pixels in an image designated as a target view among the plurality of images; and
  determining, based on the determined group and a capacity of a cache provided for information processing apparatus, a cache area to be used in a search for a line segment indicating a range where the object exists in each of the plurality of epipolar lines in the group, wherein
  the cache area is determined based on a position of an epipole at which the plurality of epipolar lines in the group intersect each other, a divergence among the plurality of epipolar lines in an area targeted for line segment searches, and a capacity of the cache.

9. The information processing method of claim 8, further comprising:
  reading a part of the silhouette image data corresponding to the cache area from the first memory and storing the read part in the cache; and
  searching for the line segment indicating the range where the object exists in each of the plurality of epipolar lines in the group, based on the silhouette image data stored in the cache.

10. A non-transitory, recording medium having stored therein a program for causing a computer included in an information processing apparatus to execute a process, the information processing apparatus being configured to reconstruct a three dimensional shape of an object from a plurality of images captured from different viewpoints by visual hull, the process comprising:
  storing, into a first memory provided for the information processing apparatus, silhouette image data of the object extracted from the plurality of images;
  determining a group of a plurality of epipolar lines having inclinations within a predetermined range in images designated as reference views among the plurality of images, based on positions of neighboring silhouette pixels in an image designated as a target view among the plurality of images; and
  determining, based on the determined group and a capacity of a cache provided for information processing apparatus, a cache area to be used in a search for a line segment indicating a range where the object exists in each of the plurality of epipolar lines in the group, wherein
  the cache area is determined based on a position of an epipole at which the plurality of epipolar lines in the group intersect each other, a divergence among the plurality of epipolar lines in an area targeted for line segment searches, and a capacity of the cache.

11. The non-transitory, recording medium of claim 10, the process further comprising:
  reading a part of the silhouette image data corresponding to the cache area from the first memory and storing the read part in the cache; and
  searching for the line segment indicating the range where the object exists in each of the plurality of epipolar lines in the group, based on the silhouette image data stored in the cache.

12. An information processing apparatus that reconstructs a three dimensional shape of an object from a plurality of images captured from different viewpoints by visual hull, comprising:
  a cache configured to store part of silhouette image data of the object extracted from the images;
  a processor coupled to the cache and configured to:
    determine a group of a plurality of epipolar lines having inclinations within a predetermined range in images designated as reference views among the plurality of images, based on positions of neighboring silhouette pixels in an image designated as a target view among the plurality of images, and
    determine, based on the determined group and a capacity of the cache, a cache area to be used in a search for a line segment indicating a range where the object exists in each of the plurality of epipolar lines in the group, wherein to determine the cache area further comprises
      determining, among the group of the plurality of epipolar lines, a first epipolar line with a maximum inclination (Imax) and a second epipolar line with a minimum inclination (IMin);
    using the linear equation of $y=a/b*x+c/b$ for the first epipolar line IMax and the second epipolar line Imin, setting the cache area to a width equal to the difference between x values of the IMax and the IMin and setting the number of lines within the cache area to the difference between y values of the IMax and the IMin.

* * * * *